US012499830B2

(12) United States Patent
Yuan

(10) Patent No.: US 12,499,830 B2
(45) Date of Patent: Dec. 16, 2025

(54) PIXEL CIRCUIT, DISPLAY PANEL, DISPLAY DEVICE, AND DRIVING METHOD

(71) Applicants: Chengdu BOE Optoelectronics Technology Co., Ltd., Sichuan Province (CN); BOE Technology Group Co., Ltd., Beijing (CN)

(72) Inventor: Changlong Yuan, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/710,221

(22) PCT Filed: Feb. 27, 2023

(86) PCT No.: PCT/CN2023/078488
§ 371 (c)(1),
(2) Date: May 15, 2024

(87) PCT Pub. No.: WO2024/178549
PCT Pub. Date: Sep. 6, 2024

(65) Prior Publication Data
US 2024/0428735 A1 Dec. 26, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC .... G09G 3/32–3291; G09G 2300/0809–0819; G09G 2300/0842;
(Continued)

(56) References Cited

U.S. PATENT DOCUMENTS

2011/0063266 A1* 3/2011 Chung ................. G09G 3/3233 345/82
2011/0164016 A1 7/2011 Kang et al.
(Continued)

FOREIGN PATENT DOCUMENTS

CN 101908316 A 12/2010
CN 107369413 A 11/2017
(Continued)

*Primary Examiner* — Nathan Danielsen
(74) *Attorney, Agent, or Firm* — Workman Nydegger

(57) ABSTRACT

A pixel circuit, a display panel, a display device, and a driving method are provided. The pixel circuit includes: a light-emitting device; a drive transistor configured to generate driving current for driving light-emitting device to emit light according to data voltage; a data writing circuit configured to provide, in response to scan signal terminal signal, data voltage of a data signal terminal to a first node; a threshold compensation circuit configured to write threshold voltage of drive transistor to a second node; a first coupling control circuit between the first node and the gate of the drive transistor and configured to stabilize voltages of first node and the gate of the drive transistor; a second coupling control circuit between the first and second nodes, and configured to stabilize voltages of first and second nodes and couple an amount of voltage variation of the first node to the second node.

17 Claims, 26 Drawing Sheets

(52) U.S. Cl.
CPC . *G09G 2300/0861* (2013.01); *G09G 2310/08* (2013.01); *G09G 2320/0223* (2013.01); *G09G 2320/0233* (2013.01); *G09G 2320/0252* (2013.01); *G09G 2320/045* (2013.01)

(58) Field of Classification Search
CPC ... G09G 2300/0852; G09G 2300/0861; G09G 2310/06; G09G 2310/061–063; G09G 2310/08; G09G 2320/0204; G09G 2320/0223; G09G 2320/0233; G09G 2320/0242; G09G 2320/0252; G09G 2320/04; G09G 2320/043; G09G 2320/045
See application file for complete search history.

(56) References Cited

U.S. PATENT DOCUMENTS

| | | | | |
|---|---|---|---|---|
| 2011/0164018 | A1 | 7/2011 | Kang et al. | |
| 2013/0335399 | A1* | 12/2013 | Tsuge | G09G 3/3233 345/212 |
| 2014/0022288 | A1* | 1/2014 | Tsuge | G09G 3/3233 345/76 |
| 2017/0148384 | A1* | 5/2017 | Lee | G09G 3/3233 |
| 2018/0308424 | A1 | 10/2018 | Toyoda et al. | |
| 2022/0319418 | A1* | 10/2022 | Yu | G09G 3/3233 |

FOREIGN PATENT DOCUMENTS

| | | | |
|---|---|---|---|
| CN | 113096593 | A | 7/2021 |
| CN | 114255708 | A | 3/2022 |
| CN | 115240582 | A | 10/2022 |
| WO | 2013021621 | A1 | 2/2013 |

* cited by examiner

PIXEL CIRCUIT, DISPLAY PANEL, DISPLAY DEVICE, AND DRIVING METHOD

CROSS-REFERENCE TO RELATED APPLICATION

This disclosure is a National Stage of International Application No. PCT/CN2023/078488, filed on Feb. 27, 2023, which is hereby incorporated by reference in its entirety.

TECHNICAL FIELD

The present disclosure relates to the technical field of display, in particular to a pixel circuit, a display panel, a display device, and a driving method.

BACKGROUND

The organic light emitting diode (OLED), the quantum dot light emitting diodes (QLED), the micro light emitting diode (Micro LED), the mini light emitting diode (Mini LED) and other light-emitting devices have the advantages of self-luminescence, low energy consumption, and the like, which is one of the hotspots in the field of application research of today's display devices. Generally, pixel circuits are used to drive the light-emitting devices to emit light.

SUMMARY

Embodiments of the present disclosure provide a pixel circuit, including: a light-emitting device; a drive transistor, configured to generate a driving current for driving the light-emitting device to emit light based on a data voltage; a data writing circuit, configured to provide a data voltage of a data signal terminal to a first node in response to a signal of a scan signal terminal; a threshold compensation circuit, configured to write a threshold voltage of the drive transistor to a second node; a first coupling control circuit, connected between the first node and a gate of the drive transistor, and configured to stabilize a voltage of the first node and a voltage of the gate of the drive transistor; and a second coupling control circuit, connected between the first node and the second node, and configured to stabilize the voltage of the first node and a voltage of the second node and to couple an amount of voltage variation of the first node to the second node.

In a possible implementation mode, the first coupling control circuit includes: a first capacitor; and a first electrode plate of the first capacitor is coupled to the gate of the drive transistor, and a second electrode plate of the first capacitor is coupled to the first node.

In a possible implementation mode, the second coupling control circuit includes: a second capacitor; and a first electrode plate of the second capacitor is coupled to the first node, and a second electrode plate of the second capacitor is coupled to the second node.

In a possible implementation mode, the threshold compensation circuit is further configured to: provide a signal of a first reference signal terminal to the gate of the drive transistor in response to a signal of a first control signal terminal; and provide a signal of a second reference signal terminal or a signal of the gate of the drive transistor to the first node in response to a signal of a second control signal terminal.

In a possible implementation mode, a maintenance duration of an active level of the first control signal terminal is greater than a maintenance duration of an active level of the second control signal terminal.

In a possible implementation mode, the active level of the first control signal terminal has an overlapping duration with the active level of the second control signal terminal.

In a possible implementation mode, an end time of the active level of the first control signal terminal is the same as an end time of the active level of the scan signal terminal; or, a start time of the active level of the scan signal terminal occurs after a third interval duration following an end time of the active level of the first control signal terminal.

In a possible implementation mode, the threshold compensation circuit is further configured to conduct a second electrode of the drive transistor and the second node in response to a signal of a third control signal terminal.

In a possible implementation mode, the third control signal terminal is at an active level when the second control signal terminal has an active level signal; and the third control signal terminal has an inactive level signal when the scan signal terminal has an active level signal.

In a possible implementation mode, the threshold compensation circuit includes: a first transistor, a second transistor, and a third transistor; a gate of the first transistor is coupled to the first control signal terminal, a first electrode of the first transistor is coupled to the first reference signal terminal, and a second electrode of the first transistor is coupled to the gate of the drive transistor; a gate of the second transistor is coupled to the second control signal terminal, a first electrode of the second transistor is coupled to the second reference signal terminal or the gate of the drive transistor, and a second electrode of the second transistor is coupled to the first node; and a gate of the third transistor is coupled to the third control signal terminal, a first electrode of the third transistor is coupled to the second electrode of the drive transistor, and a second electrode of the third transistor is coupled to the second node.

In a possible implementation mode, the second electrode of the drive transistor is directly coupled to the second node.

In a possible implementation mode, the threshold compensation circuit includes: a first transistor and a second transistor; a gate of the first transistor is coupled to the first control signal terminal, a first electrode of the first transistor is coupled to the first reference signal terminal, and a second electrode of the first transistor is coupled to the gate of the drive transistor; and a gate of the second transistor is coupled to the second control signal terminal, a first electrode of the second transistor is coupled to the second reference signal terminal, and a second electrode of the second transistor is coupled to the first node.

In a possible implementation mode, the pixel circuit further includes: an auxiliary control circuit; and the auxiliary control circuit is configured to provide a signal of a third reference signal terminal to the gate of the drive transistor in response to a signal of a fourth control signal terminal.

In a possible implementation mode, the first control signal terminal and the scan signal terminal are a same signal terminal; and/or, the second control signal terminal and the fourth control signal terminal are a same signal terminal; and/or, the third reference signal terminal and the first reference signal terminal are a same signal terminal.

In a possible implementation mode, the auxiliary control circuit includes: a sixth transistor; and a gate of the sixth transistor is coupled to the fourth control signal terminal, a first electrode of the sixth transistor is coupled to the third reference signal terminal, and a second electrode of the sixth transistor is coupled to the gate of the drive transistor.

In a possible implementation mode, the pixel circuit further includes: a reset circuit; and the reset circuit is configured to provide a signal of the fourth reference signal terminal or a signal of the first node to the second node in response to a signal of a reset signal terminal.

In a possible implementation mode, the reset circuit includes: a seventh transistor; and a gate of the seventh transistor is coupled to the reset signal terminal, a first electrode of the seventh transistor is coupled to the fourth reference signal terminal or the first node, and a second electrode of the seventh transistor is coupled to the second node.

In a possible implementation mode, the pixel circuit further includes: a light-emitting control circuit; and the light-emitting control circuit is configured to provide a signal of a first power supply terminal to the first electrode of the drive transistor in response to a signal of the light-emitting control signal terminal.

In a possible implementation mode, the data writing circuit includes: a ninth transistor; and a gate of the ninth transistor is coupled to the scan signal terminal, a first electrode of the ninth transistor is coupled to the data signal terminal, and a second electrode of the ninth transistor is coupled to the first node.

Embodiments of the present disclosure further provide a display device, including: a display panel. The display panel includes a plurality of sub-pixels; where at least one of the plurality of sub-pixels includes the above pixel circuit.

In a possible implementation mode, the display panel further includes: a plurality of scanning signal lines; where one of the plurality of scanning signal lines is coupled to scan signal terminals of pixel circuits in one row of sub-pixels; a gate drive circuit, coupled to the plurality of scanning signal lines respectively; where the gate drive circuit is configured to input scanning signals to the plurality of scanning signal lines; a plurality of control signal lines; where one of the plurality of control signal lines is coupled to second control signal terminals of pixel circuits in one row of sub-pixels; a first control drive circuit, coupled to the plurality of control signal lines respectively; where the first control drive circuit is configured to input corresponding control signals to the plurality of control signal lines; a plurality of reset signal lines; where one of the plurality of reset signal lines is coupled to reset signal terminals of pixel circuits in one row of sub-pixels; a second control drive circuit, coupled to the plurality of reset signal lines respectively; where the second control drive circuit is configured to input corresponding reset signals to the plurality of reset signal lines; a plurality of light-emitting control signal lines; where one of the plurality of light-emitting control signal lines is coupled to light-emitting control signal terminals of pixel circuits in one row of sub-pixels; and a light-emitting drive circuit, coupled to the plurality of light-emitting control signal lines respectively; where the light-emitting drive circuit is configured to input corresponding light-emitting control signals to the plurality of light-emitting control signal lines.

Embodiments of the present disclosure further provide a method for driving the above pixel circuit, including: in a threshold compensation period, writing, by a threshold compensation circuit, a threshold voltage of the drive transistor to a second node; stabilizing, by a first coupling control circuit, a voltage of the first node and a voltage of a gate of the drive transistor; and stabilizing, by a second coupling control circuit, the voltage of the first node and a voltage of the second node; in a data writing period, providing, by a data writing circuit, a data voltage of a data signal terminal to the first node in response to a signal of a scan signal terminal; stabilizing, by the first coupling control circuit, the voltage of the first node and the voltage of the gate of the drive transistor; and coupling, by the second coupling control circuit, an amount of voltage variation of the first node to the second node; and in a light-emitting period, stabilizing, by the second coupling control circuit, the voltage of the first node and the voltage of the second node; stabilizing, by the first coupling control circuit, the voltage of the first node and the voltage of the gate of the drive transistor; and generating, by the drive transistor, a driving current for driving the light-emitting device to emit light based on the data voltage, and driving the light-emitting device to emit light.

In a possible implementation mode, before the threshold compensation period, the method further includes: in an initialization period, providing, by the threshold compensation circuit, a signal of a first reference signal terminal to a gate of the drive transistor in response to a signal of a first control signal terminal; and providing, by the threshold compensation circuit, a signal of a second reference signal terminal to the first node in response to a signal of a second control signal terminal.

DETAILED DESCRIPTION

Figure 1A:
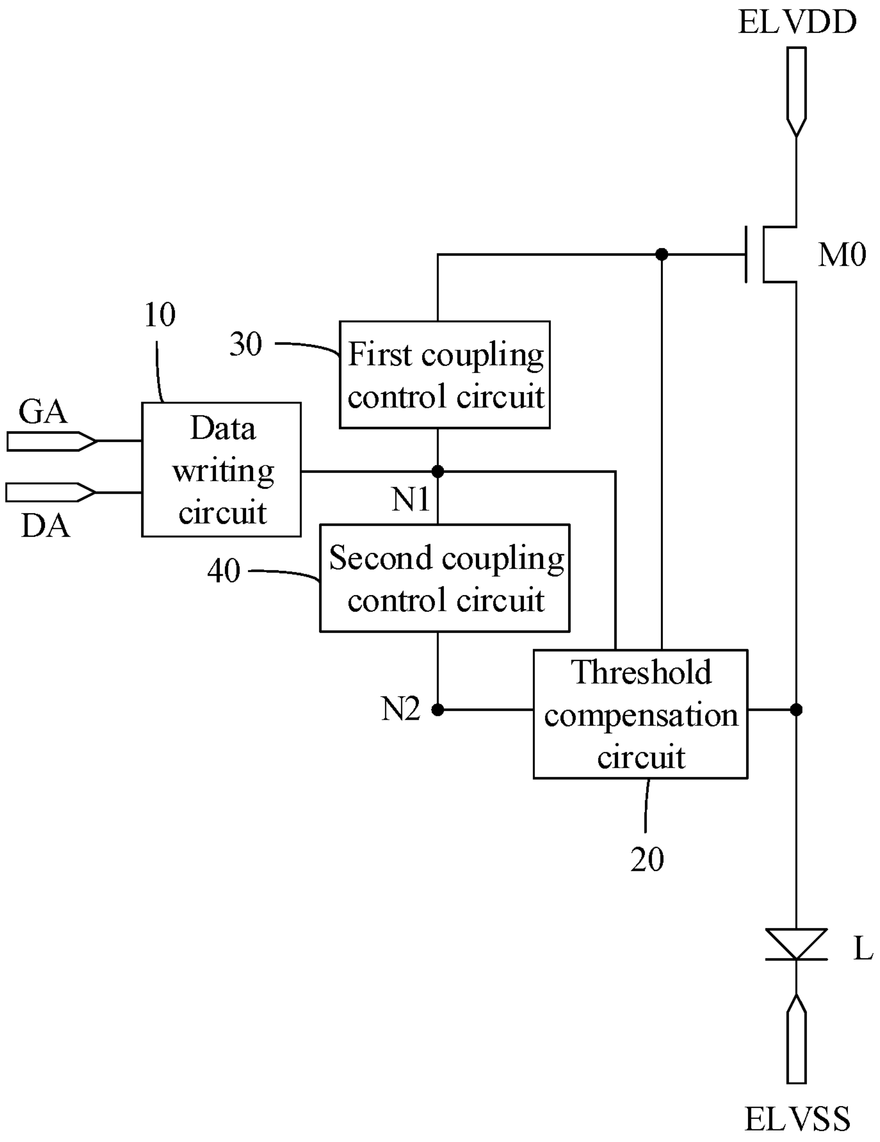
FIG. 1A shows a schematic diagram of some structures of pixel circuits provided by embodiments of the present disclosure.

In order to make the objects, technical solutions and advantages of embodiments of the present disclosure clearer, the technical solutions of the embodiments of the present disclosure will be described clearly and completely in the following in conjunction with the accompanying drawings of the embodiments of the present disclosure. Obviously, the described embodiments are a part of the embodiments of the present disclosure and not all of the embodiments. And the embodiments and the features in the embodiments of the present disclosure can be combined with each other without conflict. Based on the described embodiments of the present disclosure, all other embodiments obtained by a person of ordinary skill in the art without creative labor are within the scope of protection of the present disclosure.

Unless otherwise defined, technical or scientific terms used in the present disclosure shall have the ordinary meaning understood by a person of ordinary skill in the art to which the present disclosure belongs. The words "first", "second", and the like used in the present disclosure do not indicate any order, number, or significance, but are only used to distinguish different components. The words "including" or "comprising" and the like mean that the component or object appearing before the word encompasses the components or objects listed after the word and their equivalents, without excluding other components or objects. Words such as "connected" or "coupled" are not limited to physical or mechanical connections, but may include electrical connections, whether direct or indirect.

It should be noted that dimensions and shapes of figures in the accompanying drawings do not reflect true proportions, but are intended to illustrate the present disclosure. And throughout the same or similar reference numeral denotes the same or similar elements or elements having the same or similar function.

Embodiments of the present disclosure provide a display device including: a display panel, and the display panel includes a plurality of pixel units arranged in an array. Exemplarily, each pixel unit includes a plurality of sub-pixels. For example, the pixel unit may include a red sub-pixel, a green sub-pixel, and a blue sub-pixel, so that colors of red, green and blue may be mixed to achieve color display. Alternatively, the pixel unit may include a red sub-pixel, a green sub-pixel, a blue sub-pixel and a white sub-pixel, so that colors of red, green, blue and white may be mixed to achieve color display. Of course, in actual application, the light-emitting colors of the sub-pixels in the pixel unit may be designed and determined according to the actual application environment, which is not limited herein.

In the embodiments of the present disclosure, each sub-pixel includes a pixel circuit, and the pixel circuit includes a drive transistor and a light-emitting device to drive the light-emitting device to emit light, thereby enabling the display panel to realize the function of picture display. Due to reasons such as the process and device aging, there is unevenness in the threshold voltage Vth of the drive transistor, which leads to changes in the current flowing through different light-emitting devices and further leads to uneven display brightness, thereby affecting the display effect of the entire image. Moreover, at present, a writing path of a data voltage and a compensation path of the threshold voltage Vth in the pixel circuit are completely the same, so that the writing time of the data voltage and the compensation time of the threshold voltage Vth are also completely the same. However, the time required for the threshold voltage Vth to be fully compensated is longer, which will prolong the duration of the active level of the signal controlling the writing of the data voltage, and is not conducive to achieving high-frequency driving.

Based on this, embodiments of the present disclosure provide a pixel circuit, as shown in FIG. 1A and including: a light-emitting device L, a drive transistor M0, a data writing circuit 10, a threshold compensation circuit 20, a first coupling control circuit 30, and a second coupling control circuit 40. The first coupling control circuit 30 is connected between a first node N1 and a gate of the drive transistor M0, and the second coupling control circuit 40 is connected between the first node N1 and a second node N2.

The drive transistor M0 is configured to generate a driving current for driving the light-emitting device L to emit light based on a data voltage.

The data writing circuit 10 is configured to provide a data voltage of a data signal terminal DA to the first node N1 in response to a signal of a scan signal terminal GA.

The threshold compensation circuit 20 is configured to write a threshold voltage of the drive transistor M0 to the second node N2.

The first coupling control circuit 30 is configured to stabilize a voltage of the first node N1 and a voltage of the gate of the drive transistor M0, and couple the amount of voltage variation of the first node N1 to the gate of the drive transistor M0.

The second coupling control circuit 40 is configured to stabilize the voltage of the first node N1 and the voltage of the second node N2, couple the amount of voltage variation of the second node N2 to the first node N1, and couple the amount of voltage variation of the first node N1 to the second node N2.

In the pixel circuit provided by the embodiments of the present disclosure, the effect of a threshold voltage drift of the drive transistor on the luminescence of the light-emitting device can be avoided through the mutual cooperation of the drive transistor, the data writing circuit, the threshold compensation circuit, the first coupling control circuit, and the second coupling control circuit.

In the pixel circuit provided by the embodiments of the present disclosure, a path for compensating the threshold voltage of the drive transistor and a path for writing the data voltage are different through the mutual coordination of the drive transistor, the data writing circuit, the threshold compensation circuit, the first coupling control circuit, and the second coupling control circuit, to realize that compensation of the threshold voltage of the drive transistor is performed separately from the writing of the data voltage, which can realize high-frequency driving. Moreover, since the compensation process of the threshold voltage of the drive transistor and the process of writing the data voltage are separated, the compensation process of the threshold voltage can be performed for a longer period of time, ensuring better compensation of the threshold voltage of the drive transistor, and improving the drive rate, for example, 120 Hz, 180 Hz, and 240 Hz. This is conducive to improving the effect of the scene in the gaming and other fields, and enhancing the precision of the driving current, improving the display quality, and further improving the luminous stability as well as improving the display effect of the display panel.

Figure 1B:
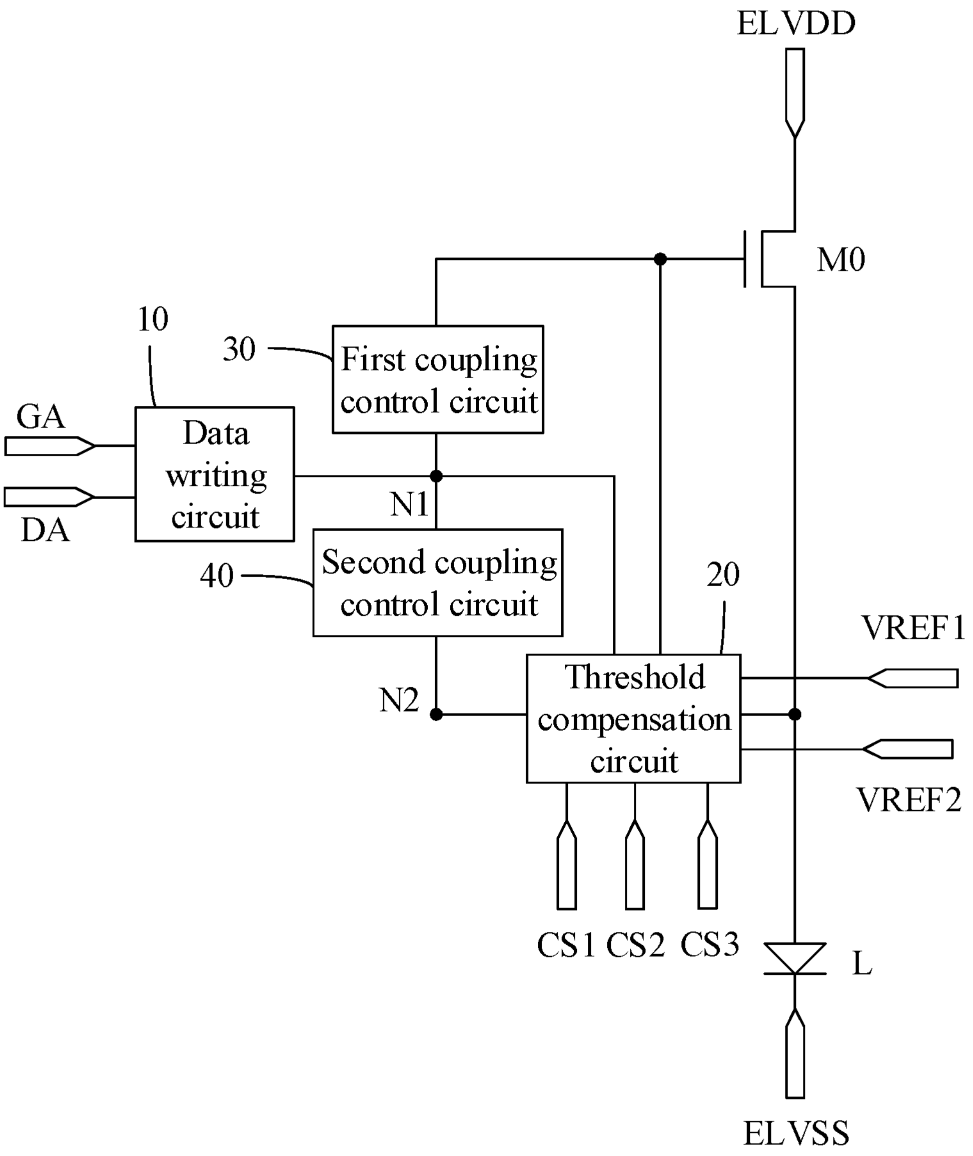
FIG. 1B shows a schematic diagram of some other structures of pixel circuits provided by embodiments of the present disclosure.

In embodiments of the present disclosure, as shown in FIG. 1B, the threshold compensation circuit 20 is further configured to provide a signal of the first reference signal terminal VREF1 to the gate of the drive transistor M0 in response to a signal of the first control signal terminal CS1; provide a signal of the second reference signal terminal VREF2 to the first node N1 in response to a signal of the second control signal terminal CS2; and conduct of the second electrode of the drive transistor M0 and the second node N2.

Exemplarily, as shown in FIG. 1B, the threshold compensation circuit 20 is further configured to conduct the second electrode of the drive transistor M0 and the second node N2 in response to the signal of the third control signal terminal CS3.

Figure 1C:
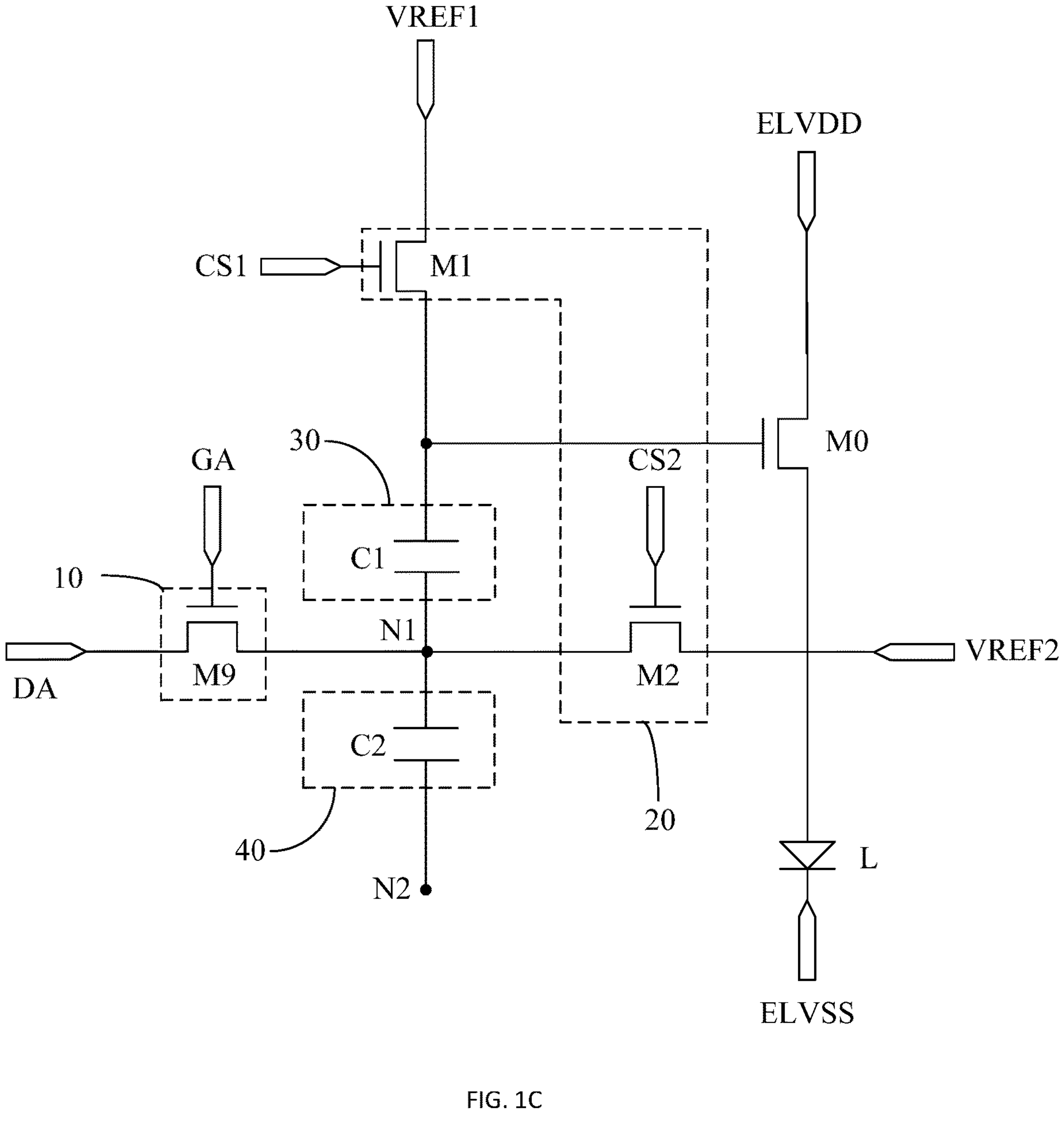
FIG. 1C shows a schematic diagram of some other structures of pixel circuits provided by embodiments of the present disclosure.

In some embodiments of the present disclosure, as shown in FIG. 1C, the first coupling control circuit 30 includes: a first capacitor C1; where a first electrode plate of the first capacitor C1 is coupled to a gate of the drive transistor M0, and a second electrode plate of the first capacitor C1 is coupled to the first node N1.

In some embodiments of the present disclosure, as shown in FIG. 1C, the second coupling control circuit 40 includes: a second capacitor C2; where a first electrode plate of the second capacitor C2 is coupled to the first node N1, and a second electrode plate of the second capacitor C2 is coupled to the second node N2.

In some embodiments of the present disclosure, as shown in FIG. 1C, the threshold compensation circuit 20 includes: a first transistor M1, a second transistor M2, and a third transistor M3. A gate of the first transistor M1 is coupled to a first control signal terminal CS1, a first electrode of the first transistor M1 is coupled to a first reference signal terminal VREF1, and a second electrode of the first transistor M1 is coupled to a gate of the drive transistor M0. A gate of the second transistor M2 is coupled to the second control signal terminal CS2, a first electrode of the second transistor M2 is coupled to the second reference signal terminal VREF2 or the gate of the drive transistor M0, and a second electrode of the second transistor M2 is coupled to the first node N1. A gate of the third transistor M3 is coupled to the third control signal terminal CS3, a first electrode of the third transistor M3 is coupled to the second electrode of the drive transistor M0, and a second electrode of the third transistor M3 is coupled to the second node N2.

Exemplarily, the first transistor M1 is conducted under the control of the active level of the first control signal at the first control signal terminal CS1, and is cut off under the control of the inactive level of the first control signal. Optionally, the first transistor M1 may be an N-type transistor, such that the active level of the first control signal is a high level and the inactive level of the first control signal is a low level. Alternatively, the first transistor M1 may be a P-type transistor, such that the active level of the first control signal is a low level and the inactive level of the first control signal is a high level.

Exemplarily, the second transistor M2 is conducted under the control of the active level of the second control signal at the second control signal terminal CS2, and is cut off under the control of the inactive level of the second control signal. Optionally, the second transistor M2 may be an N-type transistor, such that the active level of the second control signal is a high level and the inactive level of the second control signal is a low level. Alternatively, the second transistor M2 may be a P-type transistor, such that the active level of the second control signal is a low level and the inactive level of the second control signal is a high level.

Exemplarily, the third transistor M3 is conducted under the control of the active level of the third control signal at the third control signal terminal CS3, and is cut off under the control of the inactive level of the third control signal. Optionally, the third transistor M3 may be an N-type transistor, such that the active level of the third control signal is a high level and the inactive level of the third control signal is a low level. Alternatively, the third transistor M3 may also be a P-type transistor, such that the active level of the third control signal is a low level and the inactive level of the third control signal is a high level.

Figure 2A:
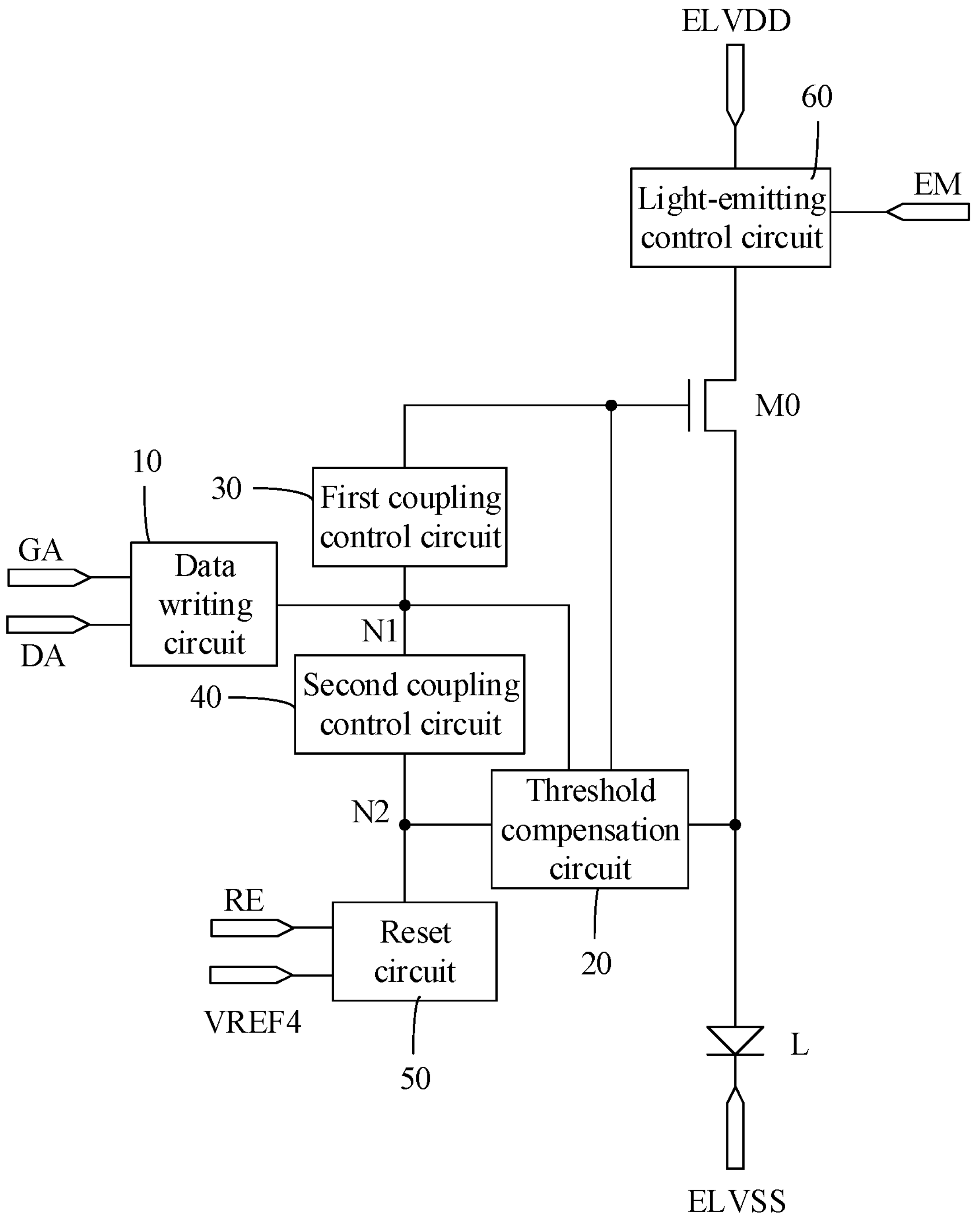
FIG. 2A shows a schematic diagram of some other structures of pixel circuits provided by embodiments of the present disclosure.
Figure 2B:
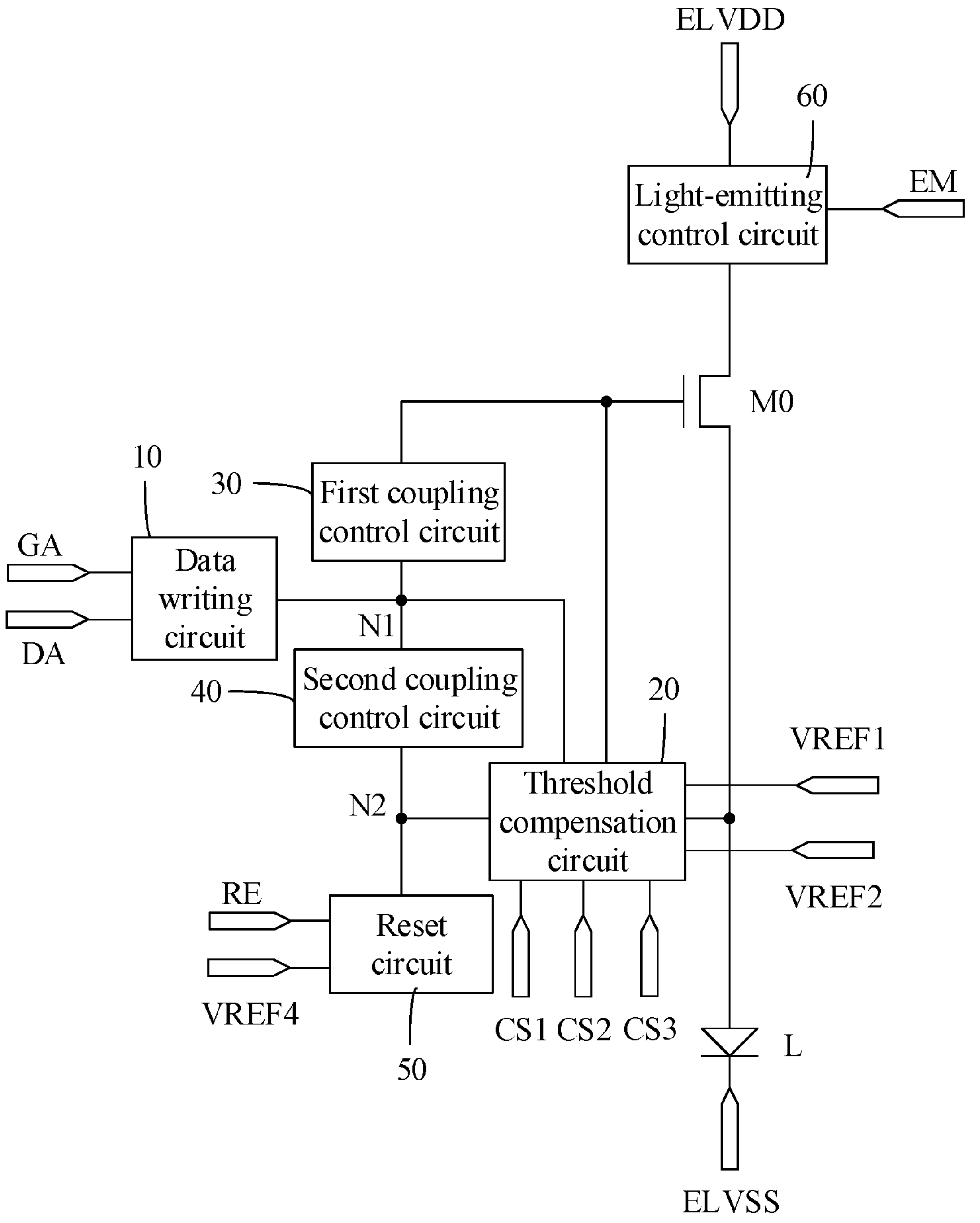
FIG. 2B shows a schematic diagram of some other structures of pixel circuits provided by embodiments of the present disclosure.

In embodiments of the present disclosure, as shown in FIG. 2A and FIG. 2B, the pixel circuit further includes: a reset circuit 50; where the reset circuit 50 is configured to provide a signal of the fourth reference signal terminal VREF4 to the second node N2 in response to a signal of the reset signal terminal RE.

In embodiments of the present disclosure, as shown in FIG. 2A and FIG. 2B, the pixel circuit further includes: a light-emitting control circuit 60; where the light-emitting control circuit 60 is configured to provide a signal of the first power supply terminal ELVDD to a first electrode of the drive transistor M0 in response to the signal of the light-emitting control signal terminal EM.

The present disclosure is described in detail below in combination with specific embodiments. It should be noted that the embodiments are intended to better explain the present disclosure, but do not limit the present disclosure.

In embodiments of the present disclosure, as shown in FIGS. 1A-2B, the drive transistor M0 may be set as an N-type transistor. The first electrode of the drive transistor M0 may be a source and the second electrode of the drive transistor M0 may be a drain. Of course, the drive transistor M0 may also be set as a P-type transistor, which is not limited herein.

In embodiments of the present disclosure, as shown in FIGS. 1A-2B, the second electrode of the drive transistor M0 is coupled to an anode of the light-emitting device L, and a cathode of the light-emitting device L is coupled to a second power supply terminal ELVSS. Exemplarily, the light-emitting device L may include: at least one of a micro light emitting diode (Micro LED), an organic light emitting diode (OLED), or a quantum dot light emitting diode (QLED). Exemplarily, the light-emitting device L may include an anode, a light-emitting layer, and a cathode that are stacked. Further, the light-emitting layer may also include film layers such as a hole injection layer, a hole transport layer, an electron transport layer, an electron injection layer. In practice, the specific structure of the light-emitting device L may be designed and determined according to the actual application environment, and is not limited herein.

Figure 3:
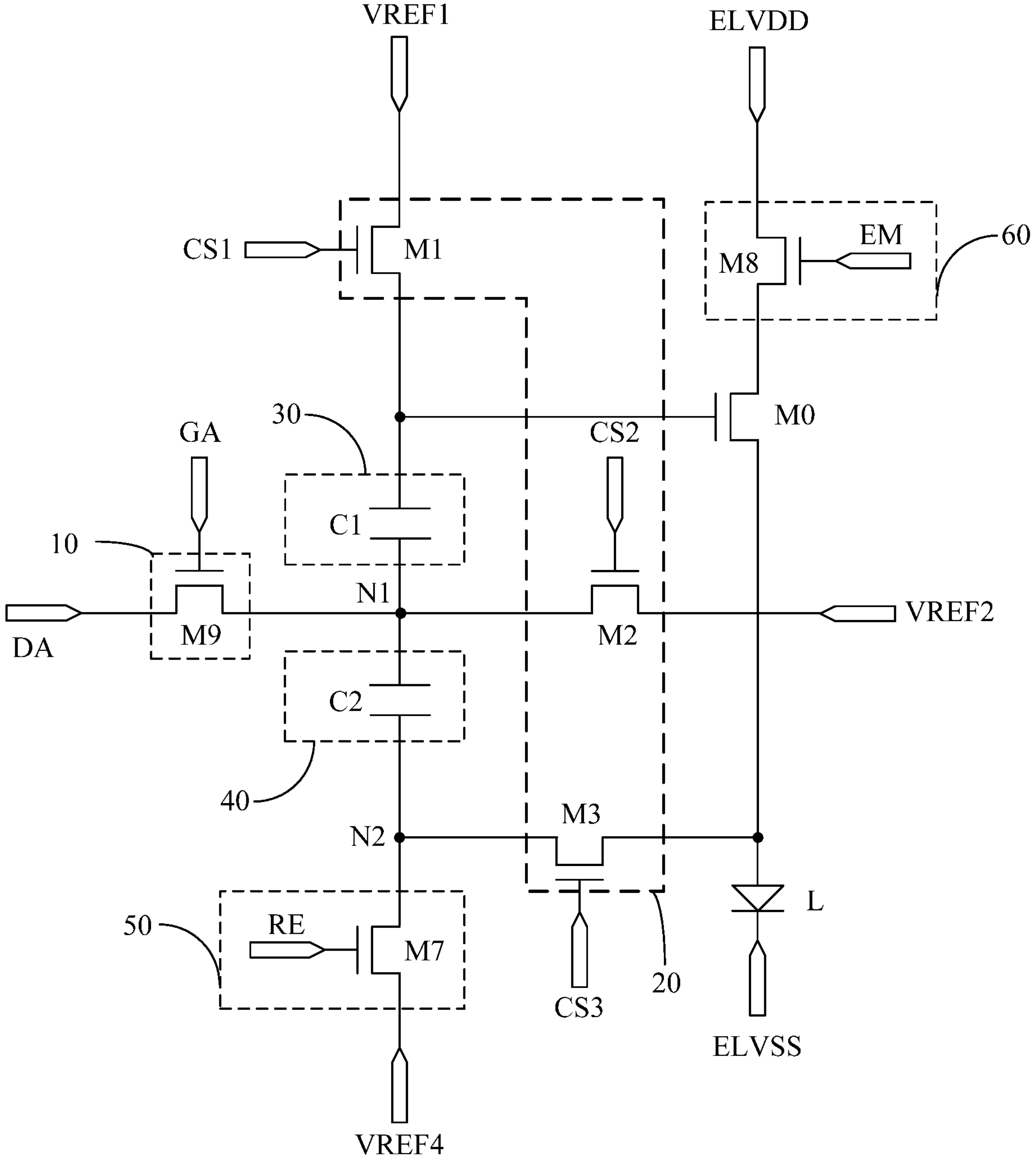
FIG. 3 shows a schematic diagram of some specific structures of pixel circuits provided by embodiments of the present disclosure.

In some embodiments of the present disclosure, as shown in FIG. 3, the first coupling control circuit 30 includes: a first capacitor C1; where a first electrode plate of the first capacitor C1 is coupled to a gate of the drive transistor M0, and a second electrode plate of the first capacitor C1 is coupled to the first node N1.

In some embodiments of the present disclosure, as shown in FIG. 3, the second coupling control circuit 40 includes: a second capacitor C2; where a first electrode plate of the second capacitor C2 is coupled to the first node N1, and a second electrode plate of the second capacitor C2 is coupled to the second node N2.

In some embodiments of the present disclosure, as shown in FIG. 3, the threshold compensation circuit 20 includes: a first transistor M1, a second transistor M2, and a third transistor M3. A gate of the first transistor M1 is coupled to a first control signal terminal CS1, a first electrode of the first transistor M1 is coupled to a first reference signal terminal VREF1, and a second electrode of the first transistor M1 is coupled to a gate of the drive transistor M0. A gate of the second transistor M2 is coupled to the second control signal terminal CS2, a first electrode of the second transistor M2 is coupled to the second reference signal terminal VREF2 or the gate of the drive transistor M0, and a second electrode of the second transistor M2 is coupled to the first node N1. A gate of the third transistor M3 is coupled to the third control signal terminal CS3, a first electrode of the third transistor M3 is coupled to the second electrode of the drive transistor M0, and the second electrode of the third transistor M3 is coupled to the second node N2.

Exemplarily, the first transistor M1 is conducted under the control of an active level of the first control signal at the first control signal terminal CS1, and is cut off under the control of an inactive level of the first control signal. Optionally, the first transistor M1 may be an N-type transistor, such that the active level of the first control signal is a high level and the inactive level of the first control signal is a low level. Alternatively, the first transistor M1 may also be a P-type transistor, such that the active level of the first control signal is a low level and the inactive level of the first control signal is a high level.

Exemplarily, the second transistor M2 is conducted under the control of the active level of the second control signal at the second control signal terminal CS2, and is cut off under the control of the inactive level of the second control signal. Optionally, the second transistor M2 may be an N-type transistor, such that the active level of the second control signal is a high level and the inactive level of the second control signal is a low level. Alternatively, the second transistor M2 may also be a P-type transistor, such that the active level of the second control signal is a low level and the inactive level of the second control signal is a high level.

Exemplarily, the third transistor M3 is conducted under the control of the active level of the third control signal at the third control signal terminal CS3, and is cut off under the control of the inactive level of the third control signal. Optionally, the third transistor M3 may be an N-type transistor, such that the active level of the third control signal is a high level and the inactive level of the third control signal is a low level. Alternatively, the third transistor M3 may also be a P-type transistor, such that the active level of the third control signal is a low level and the inactive level of the third control signal is a high level.

In some embodiments of the present disclosure, as shown in FIG. 3, the reset circuit 50 includes: a seventh transistor M7; where a gate of the seventh transistor M7 is coupled to the reset signal terminal RE, a first electrode of the seventh transistor M7 is coupled to the fourth reference signal terminal VREF4, and a second electrode of the seventh transistor M7 is coupled to the second node N2.

Exemplarily, the seventh transistor M7 is conducted under the control of an active level of the fifth control signal of the reset signal terminal RE, and is cut off under the control of an inactive level of the fifth control signal. Optionally, the seventh transistor M7 may be an N-type transistor, so that the active level of the fifth control signal is a high level and the inactive level of the fifth control signal is a low level. Alternatively, the seventh transistor M7 may also be a P-type transistor, so that the active level of the fifth control signal is a low level and the inactive level of the fifth control signal is a high level.

In some embodiments of the present disclosure, as shown in FIG. 3, the light-emitting control circuit 60 includes: an eighth transistor M8; where a gate of the eighth transistor M8 is coupled to the light-emitting control signal terminal EM, a first electrode of the eighth transistor M8 is coupled to the first power supply terminal ELVDD, and a second electrode of the eighth transistor M8 is coupled to a first electrode of the drive transistor M0.

Exemplarily, the eighth transistor M8 is conducted under the control of an active level of the light-emitting control signal of the light-emitting control signal terminal EM, and is cut off under the control of an inactive level of the light-emitting control signal. Optionally, the eighth transistor M8 may be an N-type transistor, such that the active level of the light-emitting control signal is a high level and the inactive level of the light-emitting control signal is a low level. Alternatively, the eighth transistor M8 may also be a P-type transistor, such that the active level of the light-emitting control signal is a low level and the inactive level of the light-emitting control signal is a high level.

In some embodiments of the present disclosure, as shown in FIG. 3, the data writing circuit 10 includes: a ninth transistor M9; where a gate of the ninth transistor M9 is coupled to the scan signal terminal GA, a first electrode of the ninth transistor M9 is coupled to the data signal terminal DA, and a second electrode of the ninth transistor M9 is coupled to the first node N1.

Exemplarily, the ninth transistor M9 is conducted under the control of an active level of the scanning signal of the scan signal terminal GA, and is cut off under the control of an inactive level of the scanning signal. Optionally, the ninth transistor M9 may be an N-type transistor, such that the active level of the scanning signal is a high level and the inactive level of the scanning signal is a low level. Alternatively, the ninth transistor M9 may also be a P-type transistor, such that the active level of the scanning signal is a low level and the inactive level of the scanning signal is a high level.

Exemplarily, the first electrode of the above-described transistor may be a source, and the second electrode may be a drain. Alternatively, the first electrode of the transistor may be a drain and the second electrode of the transistor may be a source. No limitation is made herein.

Generally, a transistor using the low temperature poly-silicon (LTPS) material as the active layer has a high mobility, can be made thinner and smaller, and has lower power consumption, etc. In specific implementations, the material of the active layer of at least one of the transistors mentioned above can be set as the LTPS material. In this way, the above-mentioned transistors can be set as LTPS-type transistors, so that the pixel circuit realizes a high mobility and can be made thinner and smaller, with lower power consumption, and so on.

Generally, the transistor using the metal oxide semiconductor material as the active layer has a small leakage current. Therefore, in order to reduce the leakage current, in some embodiments of the present disclosure, it is also possible to make the material of the active layer of the at least one of the transistors described above include a metal oxide semiconductor material, for example, an indium gallium zinc oxide (IGZO). Of course, it can be other metal oxide semiconductor materials, and no limitation is made herein. In this way, it is possible to set the above transistors as oxide thin film transistors, so that the leakage current of the pixel circuit is reduced.

Exemplarily, all of the transistors can be set as LTPS-type transistors. Alternatively, all of the transistors may be set as oxide transistors. Alternatively, it is possible that some of the transistors are set to be oxide transistors and the remaining transistors are set to be LTPS-type transistors. For example, the first transistor and the seventh transistor may be set as oxide transistors and the remaining transistors are set as LTPS-type transistors.

Figure 5:
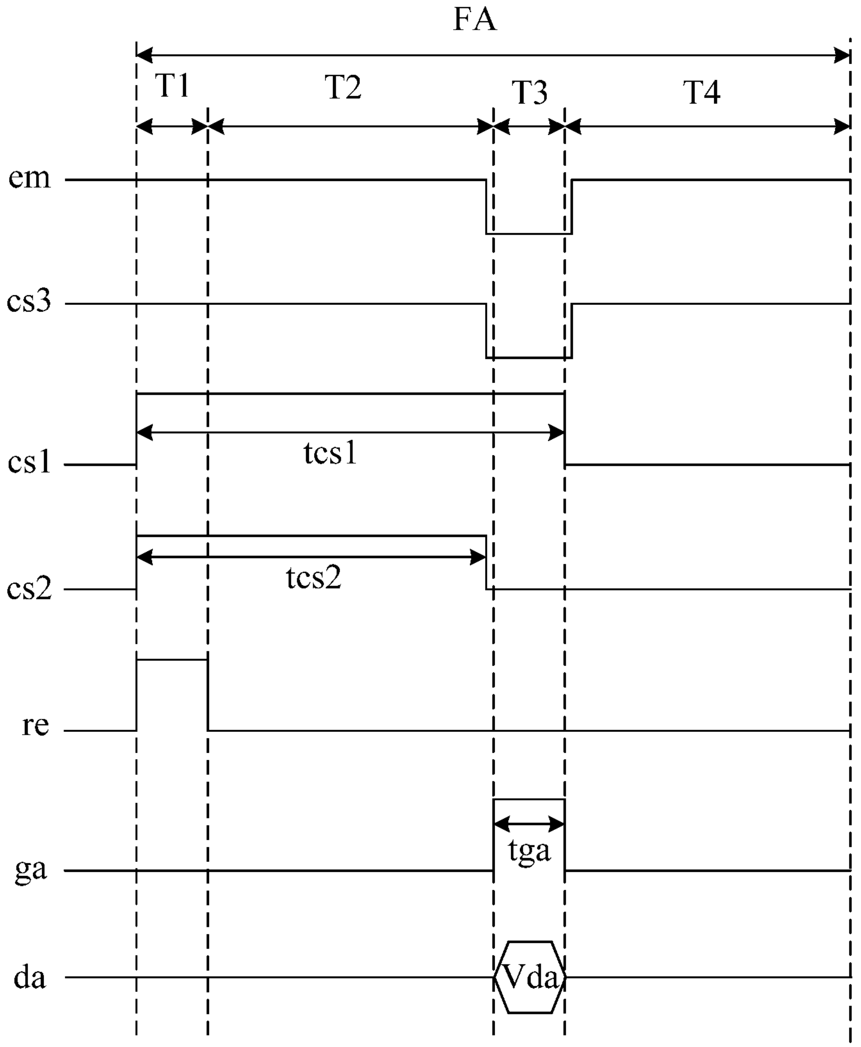
FIG. 5 shows a signal timing diagram of some pixel circuits provided by embodiments of the present disclosure.

In some embodiments of the present disclosure, the maintenance duration of the active level of the second control signal terminal CS2 may be greater than the maintenance duration of the active level of the scan signal terminal GA. For example, as shown in FIG. 5, taking the active level as a high level, cs2 represents a second control signal of the second control signal terminal CS2, ga represents a scanning signal of the scan signal terminal GA, and the maintenance duration tcs2 of the high level of the second control signal is greater than the maintenance duration tga of the high level of the scanning signal.

In some embodiments of the present disclosure, the active level of the second control signal terminal CS2 may not have an overlapping duration with the active level of the scan signal terminal GA. For example, as shown in FIG. 5, taking the active level as a high level, the high level of the second control signal does not have an overlapping duration with the high level of the scanning signal.

In some embodiments of the present disclosure, the end time of the active level of the second control signal terminal CS2 may be the same as the start time of the active level of the scan signal terminal GA. For example, as shown in FIG. 5, taking the active level as a high level, the end time of the high level of the second control signal is the same as the start time of the high level of the scanning signal.

In some embodiments of the present disclosure, it is also possible to cause the start time of the active level of the scan signal terminal GA to occur after a first interval duration following the end time of the active level of the second control signal terminal CS2. For example, taking the active level as a high level, the start time of the high level of the scanning signal occurs after a first interval duration following the end time of the high level of the second control signal. The specific value of the first interval duration may be determined according to the needs of the actual application and is not limited herein.

In some embodiments of the present disclosure, the maintenance duration of the active level of the first control signal terminal CS1 may be greater than the maintenance duration of the active level of the second control signal terminal CS2. For example, as shown in FIG. 5, taking the active level as a high level, cs1 represents a first control signal of the first control signal terminal CS1, and the maintenance duration tcs1 of the high level of the first control signal is greater than the maintenance duration tcs2 of the high level of the second control signal.

In some embodiments of the present disclosure, the active level of the first control signal terminal CS1 may have an overlapping duration with the active level of the second control signal terminal CS2. For example, as shown in FIG. 5, taking the active level as a high level, the high level of the first control signal has an overlapping duration with the high level of the second control signal.

In some embodiments of the present disclosure, the start time of the active level of the first control signal terminal CS1 may be the same as the start time of the active level of the first control signal terminal CS1. For example, as shown in FIG. 5, taking the active level as a high level, the start time of the high level of the first control signal is the same as the start time of the high level of the first control signal.

In some embodiments of the present disclosure, it is also possible to make the start time of the active level of the second control signal terminal CS2 occur after a second interval duration following the end time of the active level of the first control signal terminal CS1. For example, as shown in FIG. 5, taking the active level as a high level, the start time of the high level of the second control signal occurs after a second interval duration following the end time of the high level of the first control signal.

In some embodiments of the present disclosure, the end time of the active level of the first control signal terminal CS1 may be the same as the end time of the active level of the scan signal terminal GA. For example, as shown in FIG. 5, taking the active level as a high level, the end time of the high level of the first control signal is the same as the end time of the high level of the scanning signal.

In some embodiments of the present disclosure, it is possible to cause the start time of the active level of the scan signal terminal GA to occur after a third interval duration following the end time of the active level of the first control signal terminal CS1. For example, as shown in FIG. 5, taking the active level as a high level, the start time of the high level of the scanning signal occurs after the third interval duration following the end time of the high level of the first control signal.

In some embodiments of the present disclosure, the third control signal terminal CS3 may be at an active level when the second control signal terminal CS2 has an active level signal; and the third control signal terminal CS3 may have an inactive level signal when the scan signal terminal GA has an active level signal. For example, as shown in FIG. 5, taking the active level as a high level, cs3 represents a third control signal of the third control signal terminal CS3. The third control signal is at a high level when the second control signal is a high level signal; and the third control signal is a low level signal when the scanning signal is a high level signal.

Exemplarily, as shown in FIG. 5, em represents a light-emitting control signal of the light-emitting control signal terminal EM, and the third control signal and the light-emitting control signal may be the same. For example, a high level of the third control signal and a high level of the light-emitting control signal occur at the same time, and a low level of the third control signal and a low level of the light-emitting control signal also occur at the same time.

The driving method of the pixel circuit provided in embodiments of the present disclosure includes: a threshold compensation period T2, a data writing period T3, and a light-emitting period T4. Optionally, the driving method further includes an initialization period T1 before the threshold compensation period T2.

Figure 4:
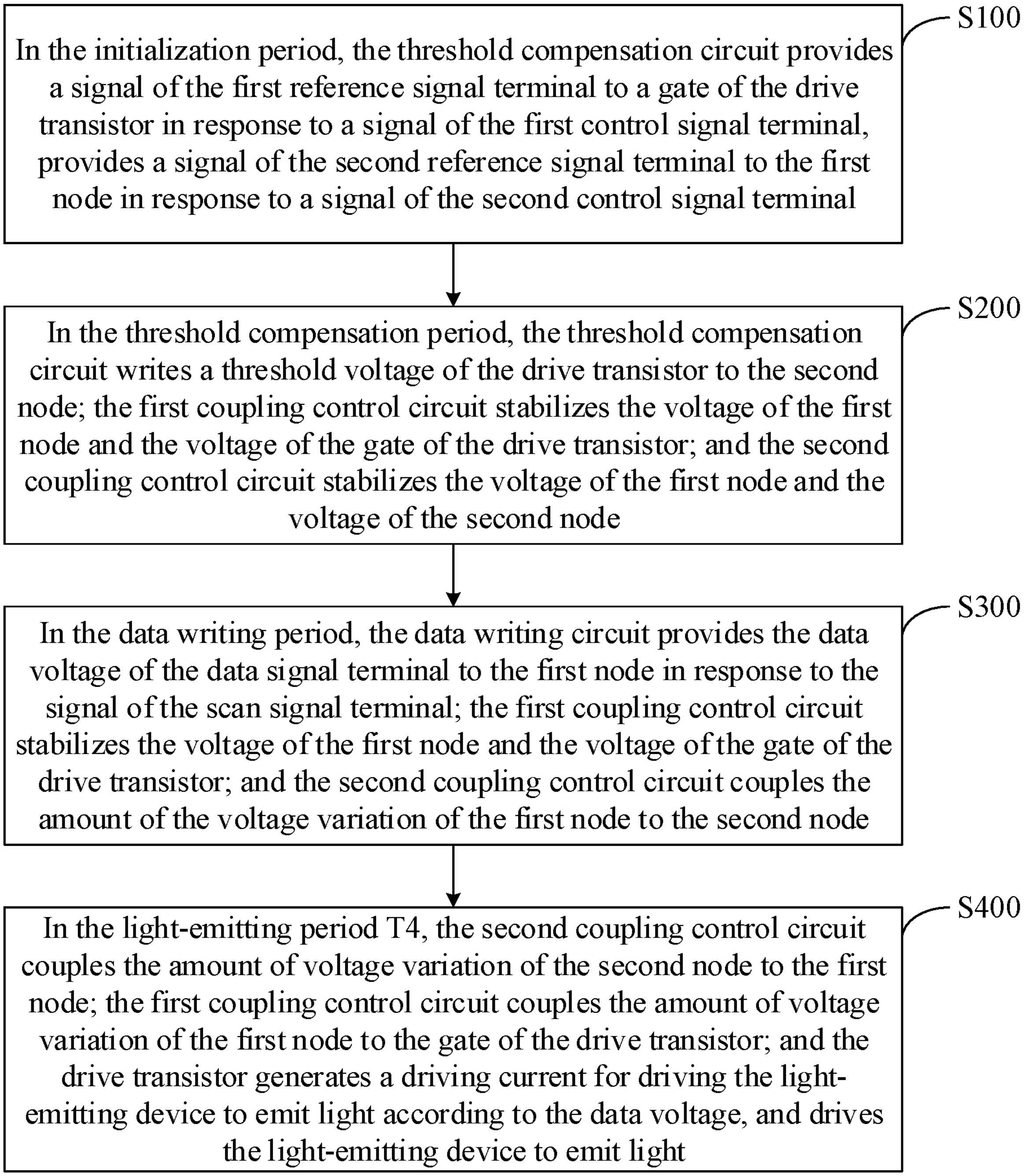
FIG. 4 shows a flowchart of a driving method of some pixel circuits provided by embodiments of the present disclosure.

Exemplarily, as shown in FIG. 4, embodiments of the present disclosure provide a working process of a pixel circuit in one display frame, including the following steps.

S100. In the initialization period T1, the threshold compensation circuit provides a signal of the first reference signal terminal to a gate of the drive transistor in response to a signal of the first control signal terminal, provides a signal of the second reference signal terminal to the first node in response to a signal of the second control signal terminal, and conducts the signal of the second electrode of the drive transistor with the second node; the first coupling control circuit stabilizes the voltage of the first node and the voltage of the gate of the drive transistor; and the second coupling control circuit stabilizes the voltage of the first node and the voltage of the second node.

S200. In the threshold compensation period T2, the threshold compensation circuit writes a threshold voltage of the drive transistor to the second node; the first coupling control circuit stabilizes the voltage of the first node and the voltage of the gate of the drive transistor; and the second coupling control circuit stabilizes the voltage of the first node and the voltage of the second node.

S300. In the data writing period T3, the data writing circuit provides the data voltage of the data signal terminal to the first node in response to the signal of the scan signal terminal; the first coupling control circuit stabilizes the voltage of the first node and the voltage of the gate of the drive transistor; and the second coupling control circuit couples the amount of the voltage variation of the first node to the second node.

S400. In the light-emitting period T4, the second coupling control circuit couples the amount of voltage variation of the second node to the first node; the first coupling control circuit couples the amount of voltage variation of the first node to the gate of the drive transistor; and the drive transistor generates a driving current for driving the light-emitting device to emit light according to the data voltage, and drives the light-emitting device to emit light.

In embodiments of the present disclosure, in the display frame, the first power supply terminal ELVDD may be configured to be loaded with a constant high voltage Vdd, and the high voltage Vdd is generally a positive value. The second power supply terminal ELVSS may be loaded with a constant low voltage Vss, and the low voltage Vss may generally be a ground voltage or a negative value. In practice, the specific values of the high voltage Vdd and the low voltage Vss may be determined according to the actual application environment and are not limited herein.

In some examples, in the following, taking the pixel circuit shown in FIG. 3 as an example, in conjunction with the signal timing diagram shown in FIG. 5, the working process of the pixel circuit provided by embodiments of the present disclosure is described.

In the embodiment of the present disclosure, as shown in FIG. 5, em represents a light-emitting control signal of the light-emitting control signal terminal EM, cs1 represents a first control signal of the first control signal terminal CS1, cs2 represents a second control signal of the second control signal terminal CS2, cs3 represents a third control signal of the third control signal terminal CS3, re represents a reset signal of the reset signal terminal RE, ga represents a scanning signal of the scan signal terminal GA, and da represents a data voltage signal of the data signal terminal DA.

Moreover, an initialization period T1, a threshold compensation period T2, a data writing period T3, and a light-emitting period T4 in the display frame FA are selected.

In the initialization period T1, a first transistor M1 is conducted under the control of a high level of a first control signal, a second transistor M2 is conducted under the control of a high level of a second control signal, a third transistor M3 is conducted under the control of a high level of a third control signal, a seventh transistor M7 is conducted under the control of a high level of a reset signal, an eighth transistor M8 is conducted under the control of a high level of a light-emitting control signal, and a ninth transistor M9 is cut off under the control of a low level of the scanning signal. The first transistor M1 which is conducted provides a first reference signal of the first reference signal terminal VREF1 to the gate of the drive transistor M0, so that the voltage $VM0g$ of the gate of the drive transistor M0 is the voltage Vref1 of the first reference signal, i.e., $VM0g$=Vref1, to initialize the gate of the drive transistor M0. The second transistor M2 which is conducted provides the second reference signal of the second reference signal terminal VREF2 to the first node N1, so that the voltage VN1 of the first node N1 is the voltage Vref2 of the second reference signal, i.e., VN1=Vref2, to initialize the first node N1. A seventh transistor M7 which is conducted provides a fourth reference signal of the fourth reference signal terminal VREF4 to the second node N2, so that the voltage VN2 of the second node N2 is the voltage Vref4 of the fourth reference signal, i.e., VN2=Vref4, to initialize the second node N2. The third transistor M3 which is conducted conducts the second node N2 with the second electrode of the drive transistor M0, so that the voltage $VM0s$ of the second electrode of the drive transistor M0 is Vref4, i.e., $VM0s$=Vref4, to initialize the second electrode of the drive transistor M0 and the anode of the light-emitting device L, so that the light-emitting device L is completely turned off and is in a black state. The eighth transistor M8 which is conducted provides the voltage Vdd of the first power supply terminal ELVDD to the first electrode of the drive transistor M0, so that the voltage $VM0d$ of the first electrode of the drive transistor M0 is Vdd, i.e., $VM0d$=Vdd, to initialize the first electrode of the drive transistor M0. The first capacitor C1 stabilizes the voltage of the gate of the drive transistor M0 and the voltage of the first node N1. The second capacitor C2 stabilizes the voltage of the first node N1 and the voltage of the second node N2.

In the threshold compensation period T2, the first transistor M1 is conducted under the control of a high level of the first control signal, the second transistor M2 is conducted under the control of a high level of the second control signal, the third transistor M3 is conducted under the control of a high level of the third control signal, the seventh transistor M7 is cut off under the control of a low level of the reset signal, the eighth transistor M8 is conducted under the control of a high level of the light-emitting control signal, and the ninth transistor M9 is cut off under the control of the low level of the scanning signal. The second transistor M2 which is on provides the second reference signal of the second reference signal terminal VREF2 to the first node N1, so that VN1=Vref2. The first transistor M1 which is on provides the first reference signal of the first reference signal terminal VREF1 to the gate of the drive transistor M0, so that VM0g=Vref1. The eighth transistor M8 which is on provides the voltage Vdd of the first power supply terminal ELVDD to the first electrode of the drive transistor M0, so that VM0d=Vdd. Thus, the drive transistor M0 is conducted, VM0s gradually increases from Vref4 until VM0s increases to Vref1−Vth, the drive transistor M0 is cut off, and the compensation process of the threshold voltage Vth is completed. The third transistor M3 which is on conducts the second electrode of the drive transistor M0 with the second node N2, so that VN2=Vref1−Vth.

The voltage value of Vref1 cannot be set arbitrarily, and it is necessary to make Vref1−Vth less than Voled (Voled represents a start-up voltage of the light-emitting device L, i.e., the voltage difference between the cathode and the anode when the light-emitting device L emits light), which ensures that the light-emitting device L will not emit light prematurely. As well, it is necessary to meet Vref1−Vdd<Vth, so that the gate and the first electrode of the drive transistor M0 are in a pinched off state.

The first capacitor C1 stabilizes the voltage of the gate of the drive transistor M0 and the voltage of the first node N1. The second capacitor C2 stabilizes the voltage of the first node N1 and the voltage of the second node N2.

In the data writing period T3, the first transistor M1 is conducted under the control of a high level of the first control signal, the second transistor M2 is cut off under the control of a low level of the second control signal, the third transistor M3 is cut off under the control of a low level of the third control signal, the seventh transistor M7 is cut off under the control of a low level of the reset signal, the eighth transistor M8 is cut off under the control of a low level of the light-emitting control signal, and the ninth transistor M9 is conducted under the control of the high level of the scanning signal. The first transistor M1 which is on provides the first reference signal of the first reference signal terminal VREF1 to the gate of the drive transistor M0, so that VM0g=Vref1. The ninth transistor M9 which is on provides the data voltage Vda of the data signal terminal DA to the first node N1, so that VN1=Vda. Since the second node N2 is in a floating state (floating), the voltage of the second node N2 varies with the voltage of the first node N1 by an equal amount. Since the amount of the voltage change of the first node N1 is Vda−Vref2, the voltage VN2 of the second node N2 changes to Vref1−Vth+Vda−Vref2. Herein, the first capacitor C1 stabilizes the voltage of the gate of the drive transistor M0 and the voltage of the first node N1.

In the light-emitting period T4, the first transistor M1 is cut off under the control of the low level of the first control signal, the second transistor M2 is cut off under the control of the low level of the second control signal, the third transistor M3 is conducted under the control of the high level of the third control signal, the seventh transistor M7 is cut off under the control of the low level of the reset signal, the eighth transistor M8 is conducted under the control of the high level of the light-emitting control signal, and the ninth transistor M9 is cut off under the control of the low level of the scanning signal. Then the gate of the drive transistor M0 and the first node N1 are in a floating state. Since the eighth transistor M8 is conducted, a high voltage of the first power supply terminal ELVDD is input to the first electrode of the drive transistor M0, and the drive transistor M0 generates a driving current. This driving current flows through the drive transistor M0 and charges the anode of the light-emitting device L, so that VM0s is gradually raised to Vss+Voled until the light-emitting device L emits light stably. At this time, VM0s=Vss+Voled. Due to the coupling effect of the first capacitance C1 and the second capacitance C2, the amount ΔVN2 of the voltage change of the second node N2, the amount ΔVN1 of the voltage change of the first node N1, and the amount ΔVM0g of the voltage change of the gate of the drive transistor M0 are the same. The third transistor M3 which is on conducts the second electrode of the drive transistor M0 with the second node N2, then ΔVN2=Vss+Voled−(Vref1−Vth+Vda−Vref2), and then VM0g=Vref1+Vss+Voled−(Vref1−Vth+Vda−Vref2). Therefore, the voltage difference Vgs between the gate and the source of the drive transistor M0 is Vref2−Vda+Vth. Then, the drive transistor M0 works in a saturation region, and the driving current I generated can be expressed as: $I=K*(Vgs-Vth)^2=K*(Vref2-Vda)^2$. Herein, K=½*μ*Cox*W/L, μ is the mobility of the drive transistor M0, Cox is the capacitance of the gate insulating layer, and W/L is the channel width-to-length ratio of the drive transistor M0.

As can be seen from the above, the driving current I is not correlated with the threshold voltage Vth of the drive transistor M0, the voltage Vss of the second power supply terminal ELVSS, and the Voled of the light-emitting device L. Then, the pixel circuit is capable of solving the problem of uneven compensation of the threshold voltage of the drive transistor M0, the voltage drop of the voltage of the second power supply terminal ELVSS, and uneven display caused by aging of the light-emitting device L, thereby improving the display effect.

Furthermore, in the threshold compensation period T2, the process of compensating the threshold voltage is realized. The process of writing the data voltage is realized in the data writing period T3, and the data voltage and the threshold voltage are coupled to the gate of the drive transistor M0 based on the coupling effect of the capacitor.

Since the path for compensating the threshold voltage of the drive transistor M0 and the path for writing the data voltage are different, and the compensation of the threshold voltage of the drive transistor M0 and the writing of the data voltage are also performed at separate times, it is possible to realize that the compensation of the threshold voltage of the drive transistor M0 and the writing of the data voltage are performed separately, so that the high-frequency driving can be realized, and the effect of the threshold voltage drift of the drive transistor M0 on the luminescence of the light-emitting device L can be avoided.

Since the process of compensating the threshold voltage of the drive transistor M0 and the process of writing the data voltage are separated, the process of compensating the threshold voltage can be performed for a longer period of time, which ensures better compensation of the threshold voltage of the drive transistor M0, and increases the driving rate, for example, 120 Hz, 180 Hz, and 240 Hz. This is conducive to improving the effect of the scene of the gaming and other fields, enhancing the precision of the driving current, improving the display quality, and further improving the luminous stability as well as improving the display effect of the display panel.

The presence of the third transistor M3 ensures that there is no parasitic capacitance Coled (i.e., capacitance formed by the cathode and anode of the light-emitting device L) of the light-emitting device L in the formula of the driving current, and also ensures that the writing of the data voltage into the second node N2 will not cause the light-emitting device L to emit light prematurely.

Figure 6:
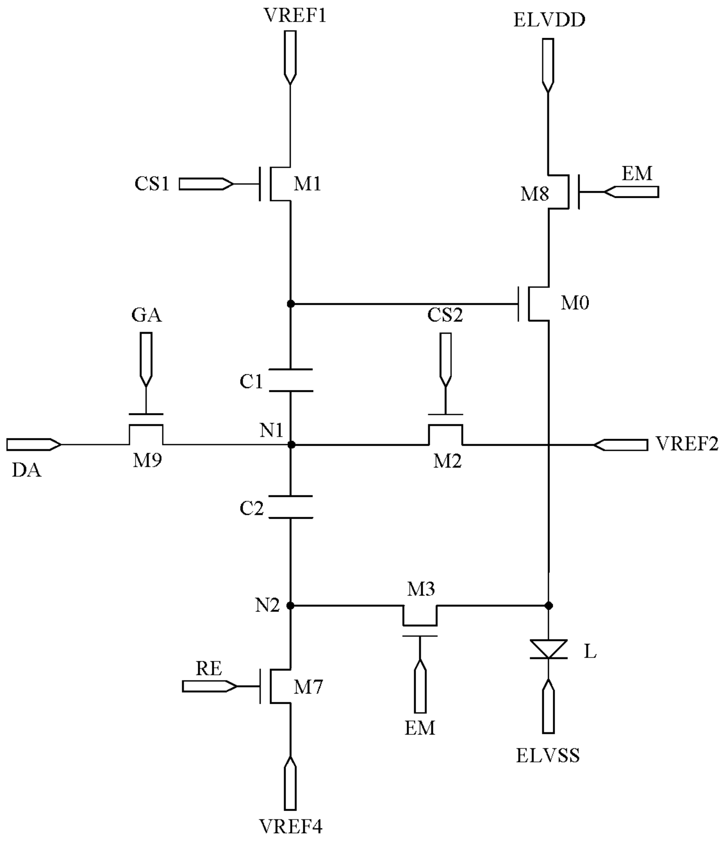
FIG. 6 shows a schematic diagram of some other specific structures of pixel circuits provided by embodiments of the present disclosure.

The embodiment of the present disclosure provides a schematic diagram of some other structures of the pixel circuit, as shown in FIG. 6, which is deformed with respect to the implementation in the above-described embodiments. Only the difference between the present embodiment and the above-described embodiments is described below, and their similarities will not be repeated herein.

In the embodiment of the present disclosure, the light-emitting control signal terminal EM and the third control signal terminal CS3 may be the same signal terminal. For example, as shown in FIG. 6, the gate of the third transistor M3 is coupled to the light-emitting control signal terminal EM. This reduces the number of signal traces and reduces the difficulty of wiring.

The signal timing diagram corresponding to the pixel circuit shown in FIG. 6 may be shown in FIG. 5. Moreover, the specific working process of the pixel circuit shown in FIG. 6 in combination with the signal timing diagram shown in FIG. 5 can refer to the above description of the embodiments and will not be repeated herein.

Figure 7:
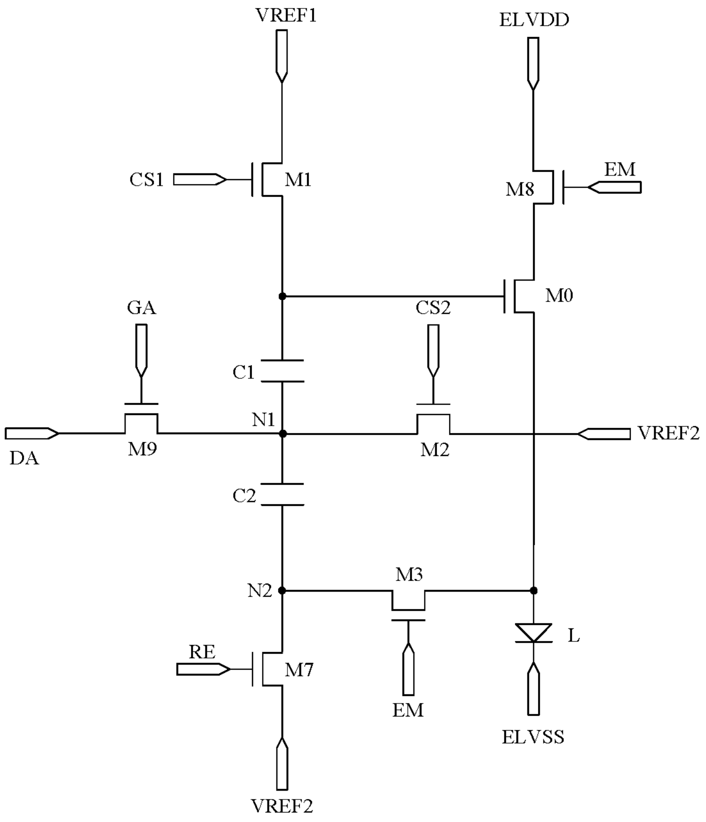
FIG. 7 shows a schematic diagram of some other specific structures of pixel circuits provided by embodiments of the present disclosure.

The embodiment of the present disclosure provides a schematic diagram of some other structures of the pixel circuit, as shown in FIG. 7, which is deformed with respect to the implementation in the above-described embodiments. Only the difference between the present embodiment and the above-described embodiments is described below, and their similarities will not be repeated herein.

In the embodiment of the present disclosure, the fourth reference signal terminal VREF4 and the second reference signal terminal VREF2 may be the same signal terminal. For example, as shown in FIG. 7, the first electrode of the seventh transistor M7 is coupled to the second reference signal terminal VREF2. This reduces the number of signal traces and reduces the difficulty of wiring.

The signal timing diagram corresponding to the pixel circuit shown in FIG. 7 may be shown in FIG. 5. Moreover, the specific working process of the pixel circuit shown in FIG. 7 in combination with the signal timing diagram shown in FIG. 5 can refer to the above description of the embodiments and will not be repeated herein.

Figure 8:
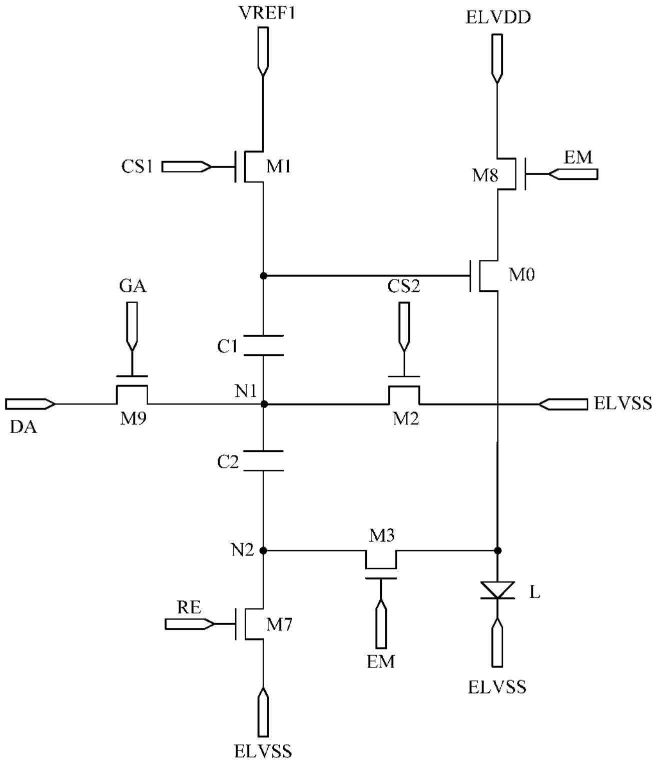
FIG. 8 shows a schematic diagram of some other specific structures of pixel circuits provided by embodiments of the present disclosure.

The embodiment of the present disclosure provides a schematic diagram of some other structures of the pixel circuit, as shown in FIG. 8, which is deformed with respect to the implementation in the above-described embodiments. Only the difference between the present embodiment and the above-described embodiments is described below, and their similarities will not be repeated herein.

In the embodiment of the present disclosure, the fourth reference signal terminal VREF4, the second reference signal terminal VREF2, and the second power supply terminal ELVSS are the same signal terminal. For example, as shown in FIG. 8, the first electrode of the seventh transistor M7 is coupled to the second power supply terminal ELVSS, and the first electrode of the second transistor M2 is coupled to the second power supply terminal ELVSS. This reduces the number of signal traces and reduces the difficulty of wiring.

The signal timing diagram corresponding to the pixel circuit shown in FIG. 8 may be shown in FIG. 5. Moreover, the specific working process of the pixel circuit shown in FIG. 8 in combination with the signal timing diagram shown in FIG. 5 may refer to the above description of the embodiment and will not be repeated herein.

Figure 9:
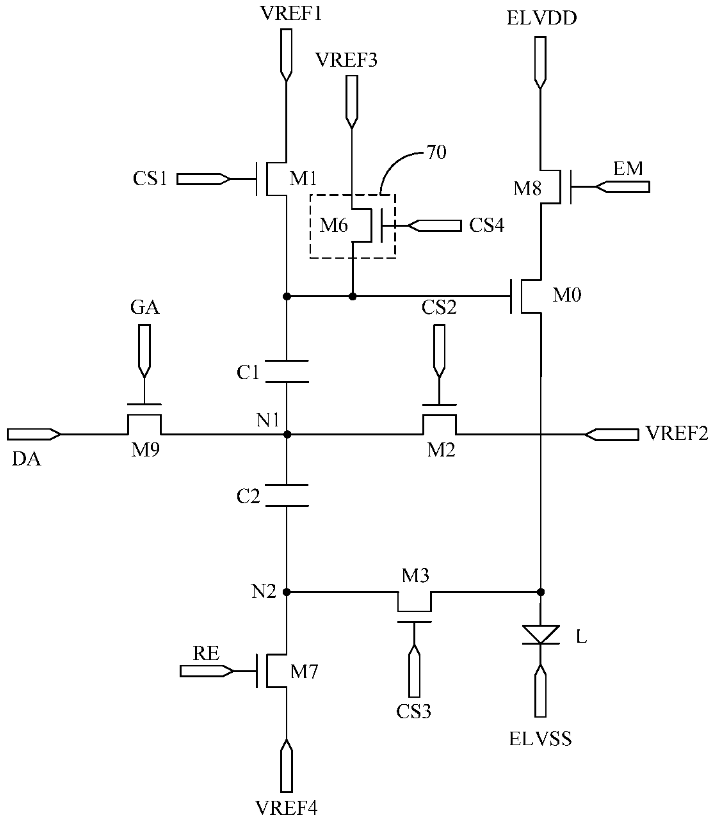
FIG. 9 shows a schematic diagram of some other specific structures of pixel circuits provided by embodiments of the present disclosure.

The embodiment of the present disclosure provides a schematic diagram of some other structures of the pixel circuit, as shown in FIG. 9, which is deformed with respect to the implementation in the above-described embodiments. Only the difference between the present embodiment and the above embodiments is described below, and their similarities will not be repeated herein.

In the embodiment of the present disclosure, as shown in FIG. 9, the pixel circuit further includes: an auxiliary control circuit 70; where the auxiliary control circuit 70 is configured to provide a signal of the third reference signal terminal VREF3 to the gate of the drive transistor M0 in response to a signal of the fourth control signal terminal CS4.

Exemplarily, as shown in FIG. 9, the auxiliary control circuit 70 includes: a sixth transistor M6; where a gate of the sixth transistor M6 is coupled to the fourth control signal terminal CS4, a first electrode of the sixth transistor M6 is coupled to the third reference signal terminal VREF3, and a second electrode of the sixth transistor M6 is coupled to a gate of the drive transistor M0.

Exemplarily, the sixth transistor M6 is conducted under the control of an active level of the fourth control signal at the fourth control signal terminal CS4, and is cut off under the control of an inactive level of the fourth control signal. Optionally, the sixth transistor M6 may be an N-type transistor, such that the active level of the fourth control signal is a high level and the inactive level of the fourth control signal is a low level. Alternatively, the sixth transistor M6 may be a P-type transistor, such that the active level of the fourth control signal is a low level and the inactive level of the fourth control signal is a high level.

Exemplarily, the fourth control signal may be the same as the second control signal.

Exemplarily, the first control signal may be the same as the scanning signal.

In some examples, in the following, taking the pixel circuit shown in FIG. 9 as an example, in conjunction with the signal timing diagram shown in FIG. 10, the working process of the pixel circuit provided by embodiments of the present disclosure is described.

Figure 10:
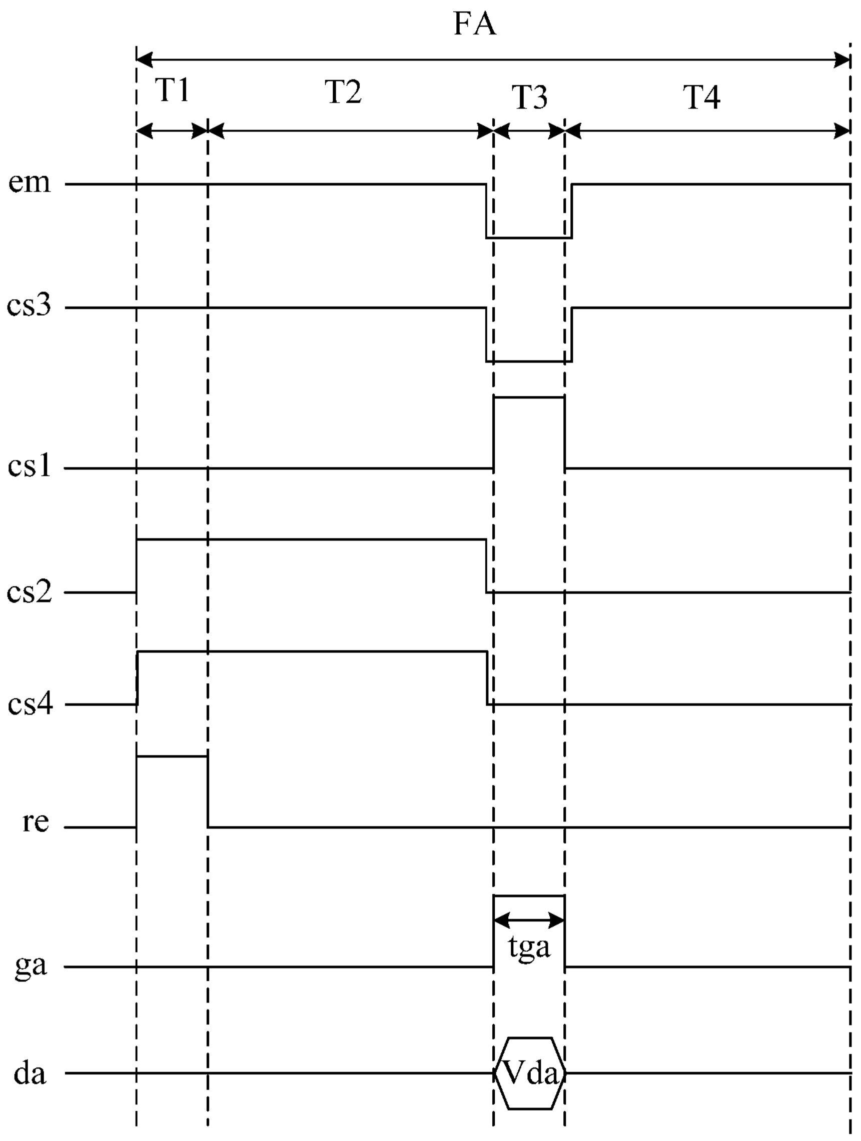
FIG. 10 shows a signal timing diagram of some other pixel circuits provided by embodiments of the present disclosure.

In the embodiment of the present disclosure, as shown in FIG. 10, em represents a light-emitting control signal of the light-emitting control signal terminal EM, cs1 represents a first control signal of the first control signal terminal CS1, cs2 represents a second control signal of the second control signal terminal CS2, cs3 represents a third control signal of the third control signal terminal CS3, cs4 represents a fourth control signal of the fourth control signal terminal CS4, re represents a reset signal of the reset signal terminal RE, ga represents a scanning signal of the scan signal terminal GA, and da represents a data voltage signal of the data signal terminal DA.

Moreover, an initialization period T1, a threshold compensation period T2, a data writing period T3, and a light-emitting period T4 in one display frame FA are selected.

In the initialization period T1, a first transistor M1 is cut off under the control of a low level of a first control signal, a second transistor M2 is conducted under the control of a high level of a second control signal, a third transistor M3 is conducted under the control of a high level of a third control signal, a sixth transistor M6 is conducted under the control of a high level of a fourth control signal, a seventh transistor M7 is conducted under the control of a high level of a reset signal, an eighth transistor M8 is conducted under the control of a high level of the light-emitting control signal, and a ninth transistor M9 is cut off under the control of a low level of the scanning signal.

The sixth transistor M6 which is on provides the third reference signal of the third reference signal terminal VREF3 to the gate of the drive transistor M0, so that the voltage VM0g of the gate of the drive transistor M0 is the voltage Vref3 of the third reference signal, i.e., VM0g=Vref3, to initialize the gate of the drive transistor M0. The second transistor M2 which is on provides the second reference signal of the second reference signal terminal VREF2 to the first node N1, so that the voltage VN1 of the first node N1 is the voltage Vref2 of the second reference signal, i.e., VN1=Vref2, to initialize the first node N1. The seventh transistor M7 which is on provides the fourth reference signal of the fourth reference signal terminal VREF4 to the second node N2, so that the voltage VN2 of the second node N2 is the voltage Vref4 of the fourth reference signal, i.e., VN2=Vref4, to initialize the second node N2. The third transistor M3 which is on conducts the second node N2 with the second electrode of the drive transistor M0, so that the voltage VM0s of the second electrode of the drive transistor M0 is Vref4, i.e., VM0s=Vref4, to initialize the second electrode of the drive transistor M0 and the anode of the light-emitting device L, so that the light-emitting device L is completely turned off and is in a black state. The eighth transistor M8 which is on provides the voltage Vdd of the first power supply terminal ELVDD to the first electrode of the drive transistor M0, so that the voltage VM0d of the first electrode of the drive transistor M0 is Vdd, i.e., VM0d=Vdd, to initialize the first electrode of the drive transistor M0. Herein, the first capacitor C1 stabilizes the voltage of the gate of the drive transistor M0 and the voltage of the first node N1. The second capacitor C2 stabilizes the voltage of the first node N1 and the voltage of the second node N2.

In the threshold compensation period T2, the first transistor M1 is cut off under the control of a low level of the first control signal, the second transistor M2 is conducted under the control of a high level of the second control signal, the third transistor M3 is conducted under the control of a high level of the third control signal, the sixth transistor M6 is conducted under the control of a high level of the fourth control signal, the seventh transistor M7 is cut off under the control of a low level of the reset signal, the eighth transistor M8 is conducted under the control of a high level of the light-emitting control signal, and the ninth transistor M9 is cut off under the control of a low level of the scanning signal.

The second transistor M2 which is on provides the second reference signal of the second reference signal terminal VREF2 to the first node N1, so that VN1=Vref2. The sixth transistor M6 which is on provides the third reference signal of the third reference signal terminal VREF3 to the gate of the drive transistor M0, so that VM0g=Vref3. The eighth transistor M8 which is on provides the voltage Vdd of the first power supply terminal ELVDD to the first electrode of the drive transistor M0, so that VM0d=Vdd. Therefore, the drive transistor M0 is conducted, VM0s gradually increases from Vref4 until VM0s increases to Vref3−Vth, the drive transistor M0 is cut off, and the compensation process of the threshold voltage Vth is completed. The third transistor M3 which is on conducts the second electrode of the drive transistor M0 with the second node N2, and then VN2=Vref3−Vth.

The voltage value of Vref3 cannot be set arbitrarily, and it is necessary to make Vref3−Vth less than Voled (Voled represents the start-up voltage of the light-emitting device L, i.e., the voltage difference between the cathode and the anode when the light-emitting device L emits light), to ensure that the light-emitting device L does not emit light prematurely. As well, it is necessary to meet Vref3−Vdd<Vth, so that the gate and the first electrode of the drive transistor M0 are in a pinched off state.

The first capacitor C1 stabilizes the voltage of the gate of the drive transistor M0 and the voltage of the first node N1. The second capacitor C2 stabilizes the voltage of the first node N1 and the voltage of the second node N2.

In the data writing period T3, the first transistor M1 is conducted under the control of a high level of the first control signal, the second transistor M2 is cut off under the control of a low level of the second control signal, the third transistor M3 is cut off under the control of a low level of the third control signal, the sixth transistor M6 is cut off under the control of a low level of the fourth control signal, the seventh transistor M7 is cut off under the control of a low level of the reset signal, the eighth transistor M8 is cut off under the control of a low level of the light-emitting control signal, and the ninth transistor M9 is conducted under the control of a high level of the scanning signal.

The first transistor M1 which is on provides the first reference signal of the first reference signal terminal VREF1 to the gate of the drive transistor M0, so that VM0g=Vref1. The ninth transistor M9 which is on provides the data voltage Vda of the data signal terminal DA to the first node N1, so that VN1=Vda. Since the second node N2 is in a floating state (floating), the voltage of the second node N2 varies with the voltage of the first node N1 by an equal amount. Since the amount of voltage change of the first node N1 is Vda−Vref2, the voltage VN2 of the second node N2 changes to Vref3−Vth+Vda−Vref2. Herein, the first capacitor C1 stabilizes the voltage of the gate of the drive transistor M0 and the voltage of the first node N1.

In the light-emitting period T4, the first transistor M1 is cut off under the control of a low level of the first control signal, the second transistor M2 is cut off under the control of a low level of the second control signal, the third transistor M3 is conducted under the control of a high level of the third control signal, the sixth transistor M6 is cut off under the control of a low level of the fourth control signal, the seventh transistor M7 is cut off under the control of a low level of the reset signal, the eighth transistor M8 is conducted under the control of a high level of the light-emitting control signal, and the ninth transistor M9 is cut off under the control of a low level of the scanning signal. Then the gate of the drive transistor M0 and the first node N1 are in a floating state. Since the eighth transistor M8 is conducted, a high voltage of the first power supply terminal ELVDD is input to the first electrode of the drive transistor M0, and the drive transistor M0 generates a driving current. This driving current flows through the drive transistor M0 and charges the anode of the light-emitting device L, so that VM0s is gradually raised to Vss+Voled until the light-emitting device L emits light stably. At this time, VM0s=Vss+Voled. Due to the coupling effect of the first capacitance C1 and the second capacitance C2, the amount ΔVN2 of the voltage change of the second node N2, the amount ΔVN1 of the voltage change of the first node N1, and the amount ΔVM0g of the voltage change of the gate of the drive transistor M0 are the same. The third transistor M3 which is on conducts the second electrode of the drive transistor M0 with the second node N2, then ΔVN2=Vss+Voled−(Vref3−Vth+Vda−Vref2), and then VM0g=Vref1+Vss+Voled−(Vref3−Vth+Vda−Vref2). Therefore, the voltage difference Vgs between the gate and source of the drive transistor M0 is Vref1−(Vref3−Vth+Vda−Vref2). Then, the drive transistor M0 works in the saturation region, and the generated driving current I can be expressed as $I=K*(Vgs-Vth)^2=K*(Vref2+Vref1-Vda+Vref3)^2$. Herein, $K=\frac{1}{2}*\mu*Cox*W/L$, $\mu$ is the mobility of the drive transistor M0, Cox is the capacitance of the gate insulating layer, and W/L is the channel width-to-length ratio of the drive transistor M0.

As can be seen from the above, the driving current I is not correlated with the threshold voltage Vth of the drive transistor M0, the voltage Vss of the second power supply terminal ELVSS, and the Voled of the light-emitting device L. The pixel circuit is capable of solving the problem of uneven compensation of the threshold voltage of the drive transistor M0, the voltage drop of the voltage of the second power supply terminal ELVSS, and the uneven display caused by aging of the light-emitting device L, thereby improving the display effect.

Furthermore, in the threshold compensation period T2, a process of compensating the threshold voltage is realized. The process of writing the data voltage is realized in the data writing period T3, and the data voltage and the threshold voltage are coupled to the gate of the drive transistor M0 based on the coupling effect of the capacitor.

Since the path for compensating the threshold voltage of the drive transistor M0 and the path for writing the data voltage are different, and the compensation of the threshold voltage of the drive transistor M0 and the writing of the data voltage are also performed at separate times, it is possible to realize that the compensation of the threshold voltage of the drive transistor M0 and the writing of the data voltage are performed separately, so that the high-frequency driving can be realized, and the effect of the threshold voltage drift of the drive transistor M0 on the luminescence of the light-emitting device L can be avoided.

Since the process of compensating the threshold voltage of the drive transistor M0 and the process of writing the data voltage are separated, the process of compensating the threshold voltage can be performed for a longer period of time, which ensures better compensation of the threshold voltage of the drive transistor M0, and increases the driving rate, for example, 120 Hz, 180 Hz, and 240 Hz. This is conducive to improving the effect of the scene of the gaming and other fields, enhancing the precision of the driving current, improving the display quality, and further improving the luminous stability as well as improving the display effect of the display panel.

The presence of the third transistor M3 ensures that there is no parasitic capacitance Coled (i.e., capacitance formed by the cathode and anode of the light-emitting device L) of the light-emitting device L in the formula of the driving current, and also ensures that the writing of the data voltage into the second node N2 will not cause the light-emitting device L to emit light prematurely.

Figure 11:
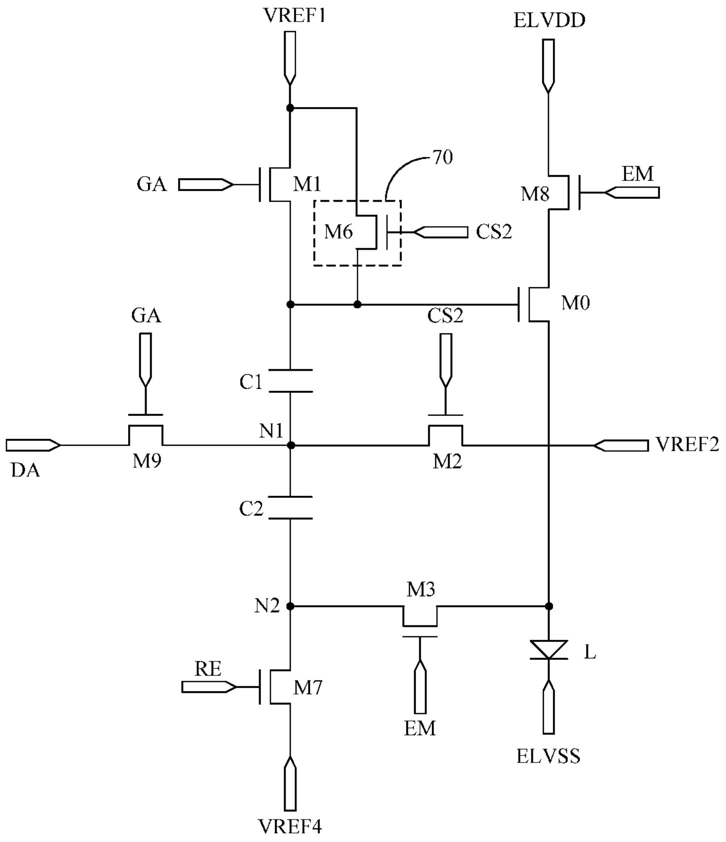
FIG. 11 shows a schematic diagram of some other specific structures of pixel circuits provided by embodiments of the present disclosure.

The embodiment of the present disclosure provides a schematic diagram of some other structures of the pixel circuits, as shown in FIG. 11, which is deformed with respect to the implementation in the above-described embodiments. Only the difference between the present embodiment and the above-described embodiments is described below, and their similarities will not be repeated herein.

In the embodiment of the present disclosure, the light-emitting control signal terminal EM and the third control signal terminal CS3 may be the same signal terminal. For example, as shown in FIG. 11, the gate of the third transistor M3 is coupled to the light-emitting control signal terminal EM. This reduces the number of signal traces and reduces the difficulty of wiring.

In the embodiment of the present disclosure, the first control signal terminal CS1 and the scan signal terminal GA may be the same signal terminal. For example, as shown in FIG. 11, the gate of the first transistor M1 is coupled to the scan signal terminal GA. This reduces the number of signal traces and reduces the difficulty of wiring.

In the embodiment of the present disclosure, the second control signal terminal CS2 and the fourth control signal terminal CS4 may be the same signal terminal. For example, as shown in FIG. 11, the gate of the sixth transistor M6 is coupled to the second control signal terminal CS2. This reduces the number of signal traces and reduces the difficulty of wiring.

In the embodiment of the present disclosure, the third reference signal terminal VREF3 and the first reference signal terminal VREF1 may be the same signal terminal. For example, as shown in FIG. 11, the first electrode of the sixth transistor M6 is coupled to the first reference signal terminal VREF1. This reduces the number of signal traces and reduces the difficulty of wiring.

A signal timing diagram corresponding to the pixel circuit shown in FIG. 11 may be shown in FIG. 10. Moreover, the specific working process of the pixel circuit shown in FIG. 11 in combination with the signal timing diagram shown in FIG. 10 may refer to the above description of the embodiments and will not be repeated herein.

Figure 12:
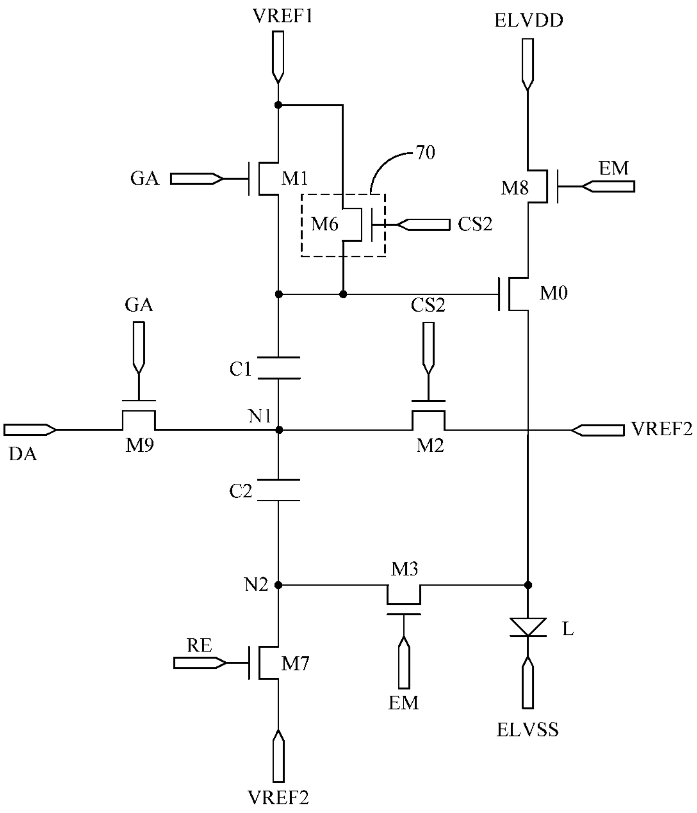
FIG. 12 shows a schematic diagram of some other specific structures of pixel circuits provided by embodiments of the present disclosure.

The embodiment of the present disclosure provides a schematic diagram of some other structures of the pixel circuits, as shown in FIG. 12, which is deformed with respect to the implementation in the above-described embodiments. Only the difference between the present embodiment and the above-described embodiments is described below, and their similarities will not be repeated herein.

In the embodiment of the present disclosure, the fourth reference signal terminal VREF4 and the second reference signal terminal VREF2 may be the same signal terminal. For example, as shown in FIG. 12, the first electrode of the seventh transistor M7 is coupled to the second reference signal terminal VREF2. This reduces the number of signal traces and reduces the difficulty of wiring.

A signal timing diagram corresponding to the pixel circuit shown in FIG. 12 may be shown in FIG. 10. Moreover, the specific working process of the pixel circuit shown in FIG. 12 in combination with the signal timing diagram shown in FIG. 10 can refer to the above description of the embodiments and will not be repeated herein.

Figure 13:
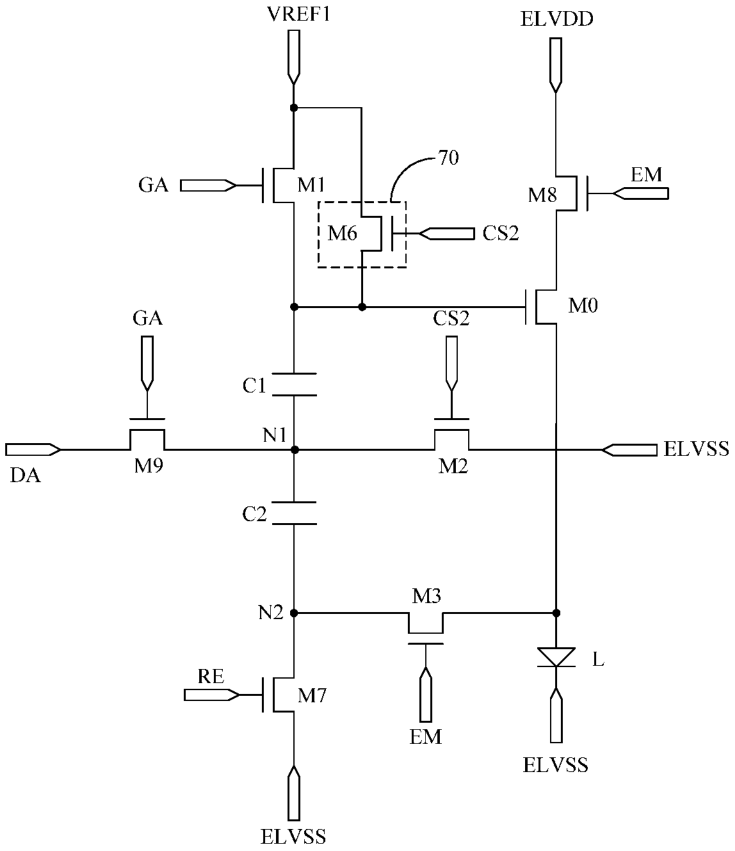
FIG. 13 shows a schematic diagram of some other specific structures of pixel circuits provided by embodiments of the present disclosure.

The embodiment of the present disclosure provides a schematic diagram of some other structures of the pixel circuits, as shown in FIG. 13, which is deformed with respect to the implementation in the above-described embodiments. Only the difference between the present embodiment and the above-described embodiments is described below, and their similarities will not be repeated herein.

In the embodiment of the present disclosure, the fourth reference signal terminal VREF4, the second reference signal terminal VREF2 and the second power supply terminal ELVSS may be the same signal terminal. For example, as shown in FIG. 13, the first electrode of the seventh transistor M7 is coupled to the second power supply terminal ELVSS, and the first electrode of the second transistor M2 is coupled to the second power supply terminal ELVSS. This reduces the number of signal traces and reduces the difficulty of wiring.

The signal timing diagram corresponding to the pixel circuit shown in FIG. 13 may be shown in FIG. 10. Moreover, the specific working process of the pixel circuit shown in FIG. 13 in combination with the signal timing diagram shown in FIG. 10 can refer to the description of the above embodiments and will not be repeated herein.

Figure 14:
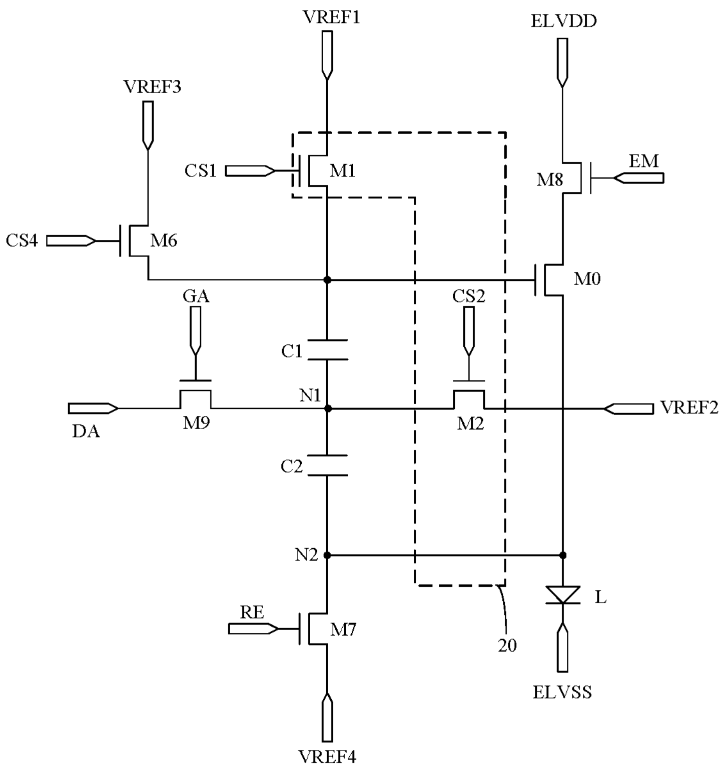
FIG. 14 shows a schematic diagram of some other specific structures of pixel circuits provided by embodiments of the present disclosure.

The embodiment of the present disclosure provides a schematic diagram of some other structures of the pixel circuits, as shown in FIG. 14, which is deformed with respect to the implementation in the above-described embodiments. Only the difference between the present embodiment and the above-described embodiments is described below, and their similarities will not be repeated herein.

In the embodiment of the present disclosure, as shown in FIG. 14, the second electrode of the drive transistor M0 and the second node N2 are directly coupled. A gate of the first transistor M1 is coupled to the first control signal terminal CS1, a first electrode of the first transistor M1 is coupled to the first reference signal terminal VREF1, and a second electrode of the first transistor M1 is coupled to a gate of the drive transistor M0. A gate of the second transistor M2 is coupled to the second control signal terminal CS2, a first electrode of the second transistor M2 is coupled to the second reference signal terminal VREF2 or the gate of the drive transistor M0, and a second electrode of the second transistor M2 is coupled to the first node N1.

Exemplarily, the first transistor M1 is conducted under the control of the active level of the first control signal of the first control signal terminal CS1, and is cut off under the control of the inactive level of the first control signal. Optionally, the first transistor M1 may be an N-type transistor, such that the active level of the first control signal is a high level and the inactive level of the first control signal is a low level. Alternatively, the first transistor M1 may be a P-type transistor, such that the active level of the first control signal is a low level and the inactive level of the first control signal is a high level.

Exemplarily, the second transistor M2 is conducted under the control of the active level of the second control signal of the second control signal terminal CS2, and is cut off under the control of the inactive level of the second control signal. Optionally, the second transistor M2 may be an N-type transistor, such that the active level of the second control signal is a high level and the inactive level of the second control signal is a low level. Alternatively, the second transistor M2 may be a P-type transistor, such that the active level of the second control signal is a low level and the inactive level of the second control signal is a high level.

Exemplarily, the fourth control signal may be the same as the second control signal.

Exemplarily, the first control signal may be the same as the scanning signal.

In some examples, in the following, taking the pixel circuit shown in FIG. 14 as an example, in conjunction with the signal timing diagram shown in FIG. 15, the working process of the pixel circuit provided by embodiments of the present disclosure is described.

Figure 15:
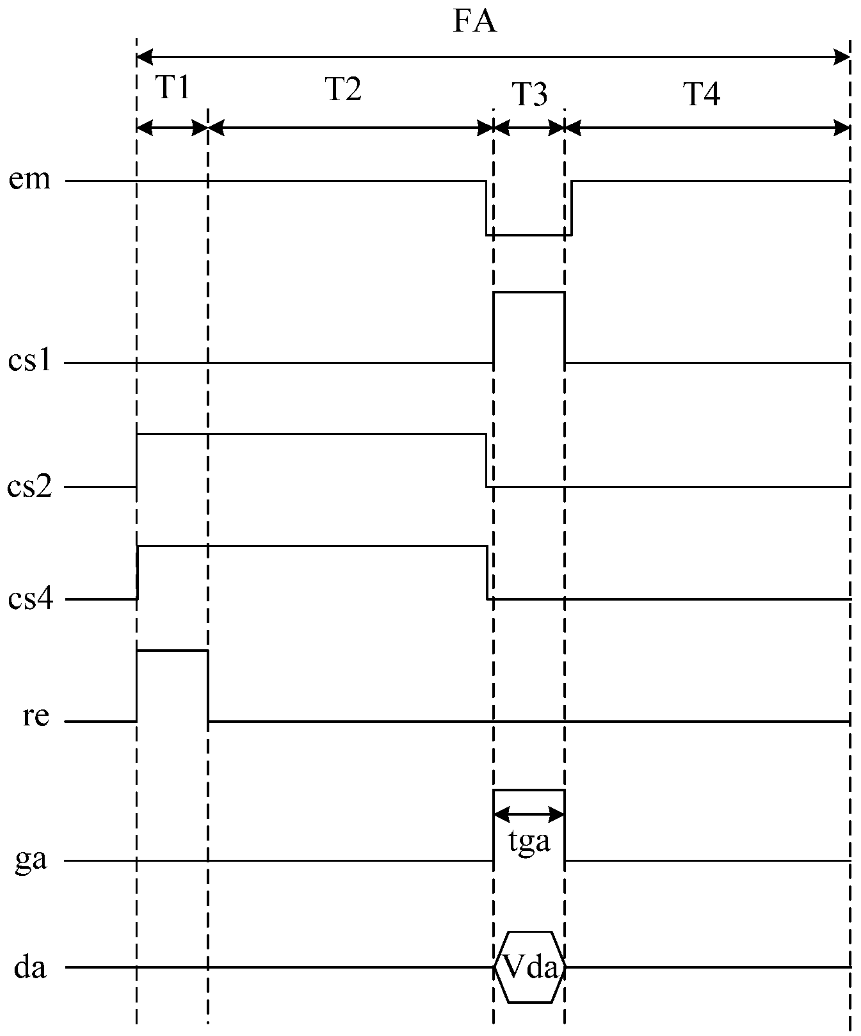
FIG. 15 shows a signal timing diagram of some other pixel circuits provided by embodiments of the present disclosure.

In the embodiment of the present disclosure, as shown in FIG. 15, em represents a light-emitting control signal of the light-emitting control signal terminal EM, cs1 represents a first control signal of the first control signal terminal CS1, cs2 represents a second control signal of the second control signal terminal CS2, cs4 represents a fourth control signal of the fourth control signal terminal CS4, re represents a reset signal of the reset signal terminal RE, ga represents a scanning signal of the scan signal terminal GA, and da represents a data voltage signal of the data signal terminal DA.

Furthermore, an initialization period T1, a threshold compensation period T2, a data writing period T3, and a light-emitting period T4 in one display frame FA are selected.

In the initialization period T1, a first transistor M1 is cut off under the control of a low level of a first control signal, a second transistor M2 is conducted under the control of a high level of a second control signal, a sixth transistor M6 is conducted under the control of a high level of a fourth control signal, a seventh transistor M7 is conducted under the control of a high level of a reset signal, an eighth transistor M8 is conducted under the control of a high level of a light-emitting control signal, and a ninth transistor M9 is cut off under the control of a low level of the scanning signal.

The sixth transistor M6 which is on provides the third reference signal of the third reference signal terminal VREF3 to the gate of the drive transistor M0, so that the voltage VM0*g* of the gate of the drive transistor M0 is the voltage Vref3 of the third reference signal, i.e., VM0*g*=Vref3, to initialize the gate of the drive transistor M0. The second transistor M2 which is on provides the second reference signal of the second reference signal terminal VREF2 to the first node N1, so that the voltage VN1 of the first node N1 is the voltage Vref2 of the second reference signal, i.e., VN1=Vref2, to initialize the first node N1. The seventh transistor M7 which is on provides the fourth reference signal of the fourth reference signal terminal VREF4 to the second node N2 and the second electrode of the drive transistor M0, so that VN2=Vref4 and VM0*s*=Vref4, to initialize the second node N2, the second electrode of the drive transistor M0 and the anode of the light-emitting device L, so that the light-emitting device L is completely turned off and is in a black state. The eighth transistor M8 which is on provides the voltage Vdd of the first power supply terminal ELVDD to the first electrode of the drive transistor M0, so that the voltage VM0*d* of the first electrode of the drive transistor M0 is Vdd, i.e., VM0*d*=Vdd, to initialize the first electrode of the drive transistor M0. Herein, the first capacitor C1 stabilizes the voltage of the gate of the drive transistor M0 and the voltage of the first node N1. The second capacitor C2 stabilizes the voltage of the first node N1 and the voltage of the second node N2.

In the threshold compensation period T2, the first transistor M1 is cut off under the control of a low level of the first control signal, the second transistor M2 is conducted under the control of a high level of the second control signal, the sixth transistor M6 is conducted under the control of a high level of the fourth control signal, the seventh transistor M7 is cut off under the control of a low level of the reset signal, the eighth transistor M8 is conducted under the control of a high level of the light-emitting control signal, and the ninth transistor M9 is cut off under the control of a low level of the scanning signal.

The second transistor M2 which is on provides the second reference signal of the second reference signal terminal VREF2 to the first node N1, so that VN1=Vref2. The sixth transistor M6 which is on provides the third reference signal of the third reference signal terminal VREF3 to the gate of the drive transistor M0, so that VM0*g*=Vref3. The eighth transistor M8 which is on provides the voltage Vdd of the first power supply terminal ELVDD to the first electrode of the drive transistor M0, so that VM0*d*=Vdd. Therefore, the drive transistor M0 is conducted, VM0*s* gradually increases from Vref4 until VM0*s* increases to Vref3−Vth, the drive transistor M0 is cut off, and the compensation process of the threshold voltage Vth is completed. Since the second electrode of the drive transistor M0 is directly connected to the second node N2, then VN2=Vref3−Vth.

The voltage value of Vref3 cannot be set arbitrarily, and it is necessary to make Vref3−Vth less than Voled (Voled represents the start-up voltage of the light-emitting device L, i.e., the voltage difference between the cathode and the anode when the light-emitting device L emits light), to ensure that the light-emitting device L will not emit light prematurely. As well, it is necessary to meet Vref3−Vdd<Vth, so that the gate and the first electrode of the drive transistor M0 are in a pinched off state.

The first capacitor C1 stabilizes the voltage of the gate of the drive transistor M0 and the voltage of the first node N1. The second capacitor C2 stabilizes the voltage of the first node N1 and the voltage of the second node N2.

In the data writing period T3, the first transistor M1 is conducted under the control of a high level of the first control signal, the second transistor M2 is cut off under the control of a low level of the second control signal, the sixth transistor M6 is cut off under the control of a low level of the fourth control signal, the seventh transistor M7 is cut off under the control of a low level of the reset signal, the eighth transistor M8 is cut off under the control of a low level of the light-emitting control signal, and the ninth transistor M9 is conducted under the control of a high level of the scanning signal.

The first transistor M1 which is on provides the first reference signal of the first reference signal terminal VREF1 to the gate of the drive transistor M0, so that VM0*g*=Vref1. The ninth transistor M9 which is on provides the data voltage Vda of the data signal terminal DA to the first node N1, so that VN1=Vda. Since the second node N2 is in a floating state (floating), through the coupling effect of the capacitor C2, VN2 may be changed to Vref3−Vth+c2/(c2+Coled)*(Vda−Vref2). Herein, Coled is the capacitance formed by the cathode and anode of the light-emitting device L. The first capacitor C1 stabilizes the voltage of the gate of the drive transistor M0 and the voltage of the first node N1.

In the light-emitting period T4, the first transistor M1 is cut off under the control of a low level of the first control signal, the second transistor M2 is cut off under the control of a low level of the second control signal, the sixth transistor M6 is cut off under the control of a low level of the fourth control signal, the seventh transistor M7 is cut off under the control of a low level of the reset signal, the eighth transistor M8 is conducted under the control of a high level of the light-emitting control signal, and the ninth transistor M9 is cut off under the control of a low level of the scanning signal. Then the gate of the drive transistor M0 and the first node N1 are in a floating state. Since the eighth transistor M8 is conducted, a high voltage of the first power supply terminal ELVDD is input to the first electrode of the drive transistor M0, and the drive transistor M0 generates a driving current. This driving current flows through the drive transistor M0 and charges the anode of the light-emitting device L, so that VM0*s* is gradually raised to Vss+Voled until the light-emitting device L emits light stably. At this time, VM0*s*=Vss+Voled. Due to the coupling effect of the first capacitance C1 and the second capacitance C2, the amount ΔVN2 of the voltage change of the second node N2, the amount ΔVN1 of the voltage change of the first node N1, and the amount ΔVM0*g* of the voltage change of the gate of the drive transistor M0 are the same. The third transistor M3 which is on conducts the second electrode of the drive transistor M0 with the second node N2, then ΔVN2=Vss+Voled−[Vref3−Vth+c2/(c2+Coled)*(Vda−Vref2)], and VM0*g*=Vref1+Vss+Voled−[Vref3−Vth+c2/(c2+Coled)*(Vda−Vref2)]. Therefore, the voltage difference Vgs between the gate and the source of the drive transistor M0 is Vref1−Vref3+Vth−c2/(c2+Coled)*(Vda−Vref2). Then, the drive transistor M0 works in the saturation region, and the generated driving current I can be expressed as $I=K^*(Vgs-Vth)^2=K^*(Vref1-Vref3-c2/(c2+Coled)^*(Vda-Vref2))^2$. Herein, K=½*μ*Cox*W/L, μ is the mobility of the drive transistor M0, Cox is the capacitance of the gate insulating layer, and W/L is the channel width-to-length ratio of the drive transistor M0.

As can be seen from the above, the driving current I is not correlated with the threshold voltage Vth of the drive transistor M0, the voltage Vss of the second power supply terminal ELVSS, and the Voled of the light-emitting device L. Then, the pixel circuit is capable of solving the problem of uneven compensation of the threshold voltage of the drive transistor M0, the voltage drop of the voltage of the second power supply terminal ELVSS, and uneven display caused by aging of the light-emitting device L, thereby improving the display effect.

Furthermore, in the threshold compensation period T2, a process of compensating the threshold voltage is realized. In the data writing period T3, the process of writing the data voltage is realized, and the data voltage and the threshold voltage are coupled to the gate of the drive transistor M0 based on the coupling effect of the capacitor.

Since the path for compensating the threshold voltage of the drive transistor M0 and the path for writing the data voltage are different, and the compensation of the threshold voltage of the drive transistor M0 and the writing of the data voltage are also performed at separate times, it is possible to realize that the compensation of the threshold voltage of the drive transistor M0 is performed separately from the writing of the data voltage, so that the high-frequency driving can be realized, and the effect of the threshold voltage drift of the drive transistor M0 on the luminescence of the light-emitting device L can be avoided.

Since the process of compensating the threshold voltage of the drive transistor M0 and the process of writing the data voltage are separated, the process of compensating the threshold voltage can be performed for a longer period of time, which ensures better compensation of the threshold voltage of the drive transistor M0, and increases the driving rate, for example, 120 Hz, 180 Hz, and 240 Hz. This is conducive to improving the effect of the scene of the gaming and other fields, enhancing the precision of the driving current, improving the display quality, and further improving the luminous stability as well as improving the display effect of the display panel.

The presence of the third transistor M3 ensures that there is no parasitic capacitance Coled (i.e., capacitance formed by the cathode and anode of the light-emitting device L) of the light-emitting device L in the formula of the driving current, and also ensures that the writing of the data voltage into the second node N2 will not cause the light-emitting device L to emit light prematurely.

Figure 16:
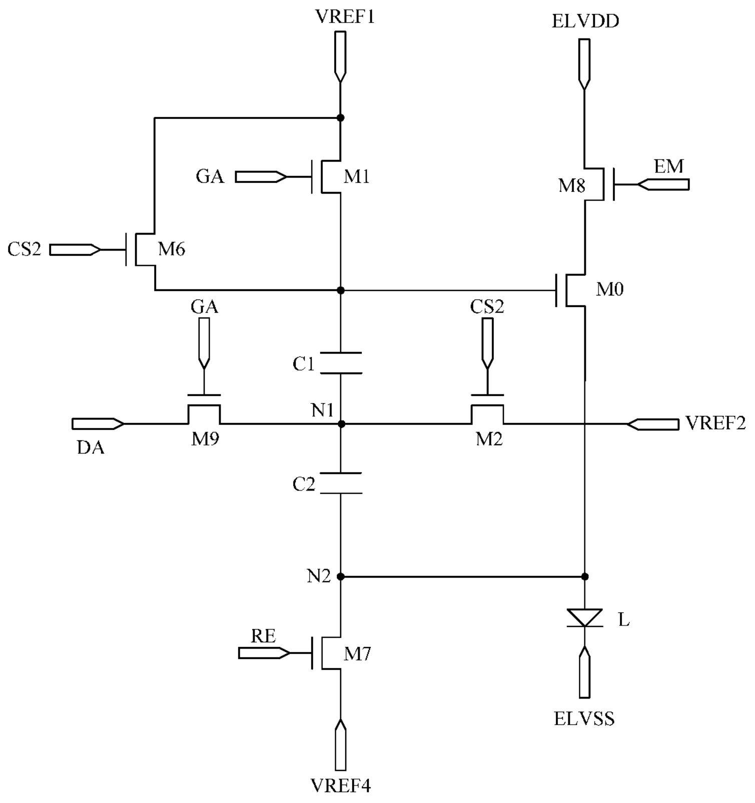
FIG. 16 shows a schematic diagram of some other specific structures of pixel circuits provided by embodiments of the present disclosure.

The embodiment of the present disclosure provides a schematic diagram of some other structures of the pixel circuits, as shown in FIG. 16, which is deformed with respect to the implementation in the above-described embodiments. Only the difference between the present embodiment and the above-described embodiments is described below, and their similarities will not be repeated herein.

In the embodiment of the present disclosure, the first control signal terminal CS1 and the scan signal terminal GA may be the same signal terminal. For example, as shown in FIG. 16, the gate of the first transistor M1 is coupled to the scan signal terminal GA. This reduces the number of signal traces and reduces the difficulty of wiring.

In the embodiment of the present disclosure, the second control signal terminal CS2 and the fourth control signal terminal CS4 may be the same signal terminal. For example, as shown in FIG. 16, the gate of the sixth transistor M6 is coupled to the second control signal terminal CS2. This reduces the number of signal traces and reduces the difficulty of wiring.

In the embodiment of the present disclosure, the third reference signal terminal VREF3 and the first reference signal terminal VREF1 may be the same signal terminal. For example, as shown in FIG. 16, the first electrode of the sixth transistor M6 is coupled to the first reference signal terminal VREF1. This reduces the number of signal traces and reduces the difficulty of wiring.

A signal timing diagram corresponding to the pixel circuit shown in FIG. 16 may be shown in FIG. 15. Moreover, the specific working process of the pixel circuit shown in FIG. 16 in conjunction with the signal timing diagram shown in FIG. 10 can refer to the above description of the embodiments and will not be repeated herein.

Figure 17A:
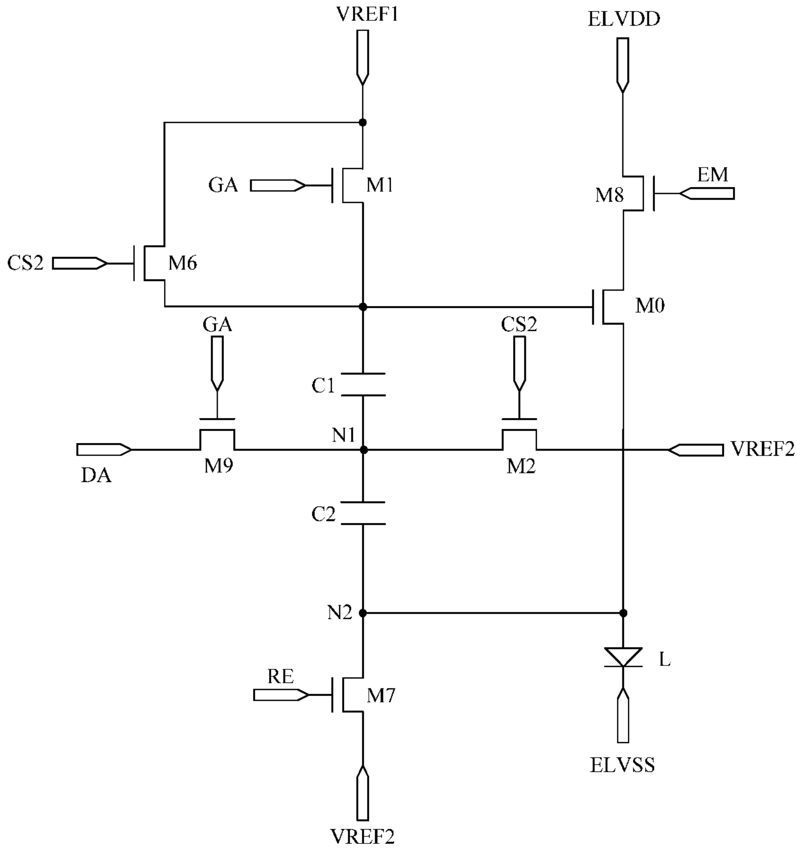
FIG. 17A shows a schematic diagram of some other specific structures of pixel circuits provided by embodiments of the present disclosure.

The embodiment of the present disclosure provides a schematic diagram of some other structures of the pixel circuits, as shown in FIG. 17A, which is deformed with respect to the implementation in the above-described embodiments. Only the difference between the present embodiment and the above-described embodiments is described below, and their similarities will not be repeated herein.

In the embodiment of the present disclosure, the fourth reference signal terminal VREF4 and the second reference signal terminal VREF2 may be the same signal terminal. For example, as shown in FIG. 17A, the first electrode of the seventh transistor M7 is coupled to the second reference signal terminal VREF2. This reduces the number of signal traces and reduces the difficulty of wiring.

A signal timing diagram corresponding to the pixel circuit shown in FIG. 17A may be shown in FIG. 15. Moreover, the specific working process of the pixel circuit shown in FIG. 17A in combination with the signal timing diagram shown in FIG. 15 can refer to the above description of the embodiments and will not be repeated herein.

Figure 17B:
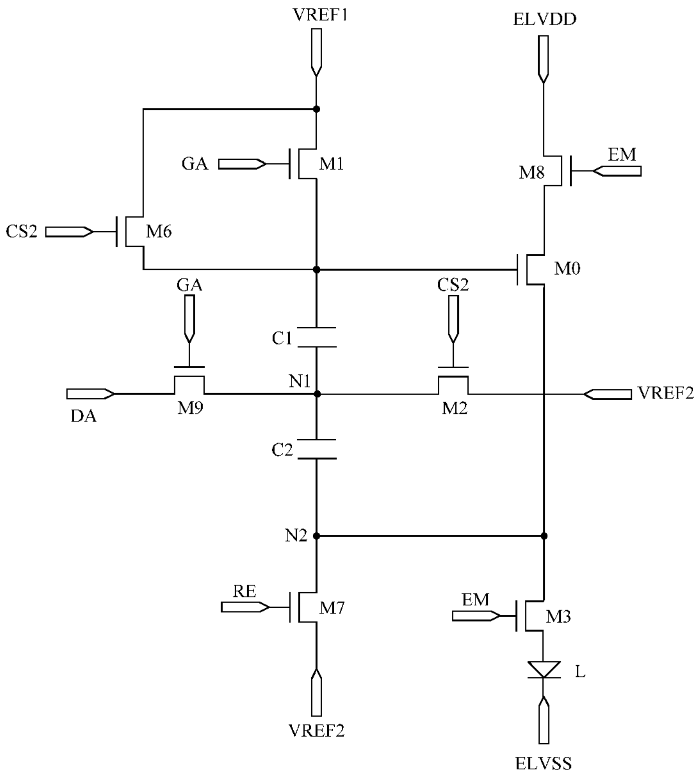
FIG. 17B shows a schematic diagram of some other specific structures of pixel circuits provided by embodiments of the present disclosure.

The embodiment of the present disclosure provides a schematic diagram of some other structures of the pixel circuits, as shown in FIG. 17B, which is deformed with respect to the implementation in the above-described embodiments. Only the difference between the present embodiment and the above-described embodiments is described below, and their similarities will not be repeated herein.

In the embodiment of the present disclosure, as shown in FIG. 17B, both the second electrode of the drive transistor M0 and the second node N2 are coupled to the anode of the light-emitting device L via the third transistor M3.

In the embodiment of the present disclosure, the fourth reference signal terminal VREF4 and the second reference signal terminal VREF2 may be the same signal terminal. For example, as shown in FIG. 17B, the first electrode of the seventh transistor M7 is coupled to the second reference signal terminal VREF2. This reduces the number of signal traces and reduces the difficulty of wiring.

A signal timing diagram corresponding to the pixel circuit shown in FIG. 17B may be shown in FIG. 15. Moreover, the specific working process of the pixel circuit shown in FIG. 17B in combination with the signal timing diagram shown in FIG. 15 may refer to the above description of the embodiments and will not be repeated herein.

Figure 17C:
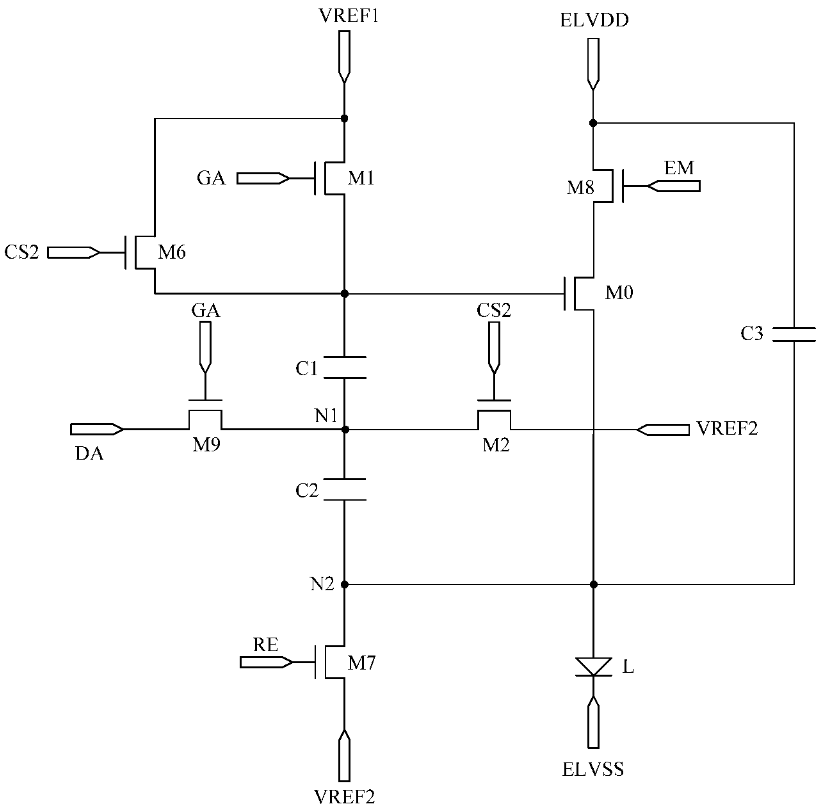
FIG. 17C shows a schematic diagram of some other specific structures of pixel circuits provided by embodiments of the present disclosure.

The embodiment of the present disclosure provides a schematic diagram of some other structures of the pixel circuits, as shown in FIG. 17C, which is deformed with respect to the implementation in the above-described embodiments. Only the difference between the present embodiment and the above-described embodiments is described below, and their similarities will not be repeated herein.

In the embodiment of the present disclosure, as shown in FIG. 17C, the pixel circuit may further include a third capacitor C3. The third capacitor C3 is connected between the first power supply terminal ELVDD and the anode of the light-emitting device L.

In the embodiment of the present disclosure, the fourth reference signal terminal VREF4 and the second reference signal terminal VREF2 may be the same signal terminal. For example, as shown in FIG. 17C, the first electrode of the seventh transistor M7 is coupled to the second reference signal terminal VREF2. This reduces the number of signal traces and reduces the difficulty of wiring.

A signal timing diagram corresponding to the pixel circuit shown in FIG. 17C may be shown in FIG. 15. Moreover, in the pixel circuit shown in FIG. 17C in conjunction with the signal timing diagram shown in FIG. 15, the working process in the initialization period T1 and the threshold compensation period T2 may refer to the description of the above embodiments, and will not be repeated herein.

In the data writing period T3, the first transistor M1 which is on provides the first reference signal of the first reference signal terminal VREF1 to the gate of the drive transistor M0, so that VM0*g*=Vref1. The ninth transistor M9 which is on provides the data voltage Vda of the data signal terminal DA to the first node N1, so that VN1=Vda. Since the second node N2 is in a floating state (floating), through the coupling effect of the second capacitor C2 and the third capacitor C3, VN2 can be changed to: Vref3−Vth+c2/(c2+Coled+c3)*(Vda−Vref2). Herein, c3 represents the capacitance value of the third capacitor C3, and the first capacitor C1 stabilizes the voltage of the gate of the drive transistor M0 and the voltage of the first node N1. The rest of the working process can refer to the above-described embodiments and will not be repeated herein.

In the light emitting period T4, ΔVN2=Vss+Voled−[Vref3−Vth+c2/(c2+Coled+c3)*(Vda−Vref2)], and VM0*g*=Vref1+Vss+Voled−[Vref3−Vth+c2/(c2+Coled+c3)*(Vda−Vref2)]. The drive transistor M0 works in the saturation region, and the driving current I generated can be expressed as $I=K^*(Vgs-Vth)^2=K^*(Vref1-Vref3-c2/(c2+Coled+c2)^*(Vda-Vref2))^2$. The rest of the working process can refer to the above embodiments, and will not be repeated herein.

In the embodiment of the present application, c3 can be added to the formula of the driving current I by adding the third capacitor C3. Due to the difficulty in adjusting the capacitance value c2 of the second capacitor C2 and the capacitance Coled formed by the cathode and the anode of the light-emitting device L, adding the third capacitor C3 can facilitate the adjustment of capacitance voltage division.

Figure 18:
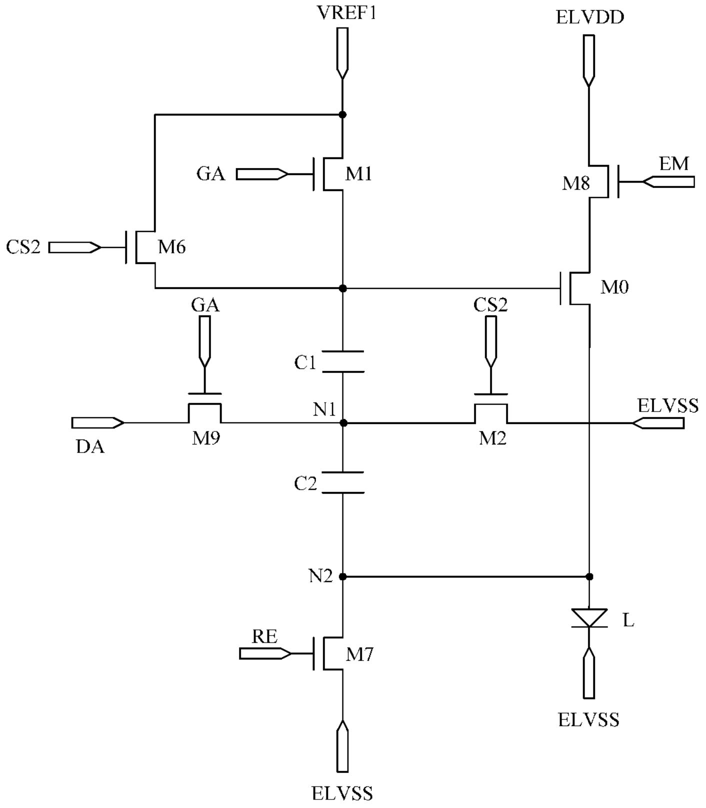
FIG. 18 shows a schematic diagram of some other specific structures of pixel circuits provided by embodiments of the present disclosure.

The embodiment of the present disclosure provides a schematic diagram of some other structures of the pixel circuits, as shown in FIG. 18, which is deformed with respect to the implementation in the above-described embodiments. Only the difference between the present embodiment and the above-described embodiments is described below, and their similarities will not be repeated herein.

In the embodiment of the present disclosure, the fourth reference signal terminal VREF4, the second reference signal terminal VREF2 and the second power supply terminal ELVSS may be the same signal terminal. For example, as shown in FIG. 18, the first electrode of the seventh transistor M7 is coupled to the second power supply terminal ELVSS, and the first electrode of the second transistor M2 is coupled to the second power supply terminal ELVSS. This reduces the number of signal traces and reduces the difficulty of wiring.

The signal timing diagram corresponding to the pixel circuit shown in FIG. 18 may be shown in FIG. 15. Moreover, the specific working process of the pixel circuit shown in FIG. 18 in combination with the signal timing diagram shown in FIG. 15 can refer to the description of the above embodiments and will not be repeated herein.

Figure 19:
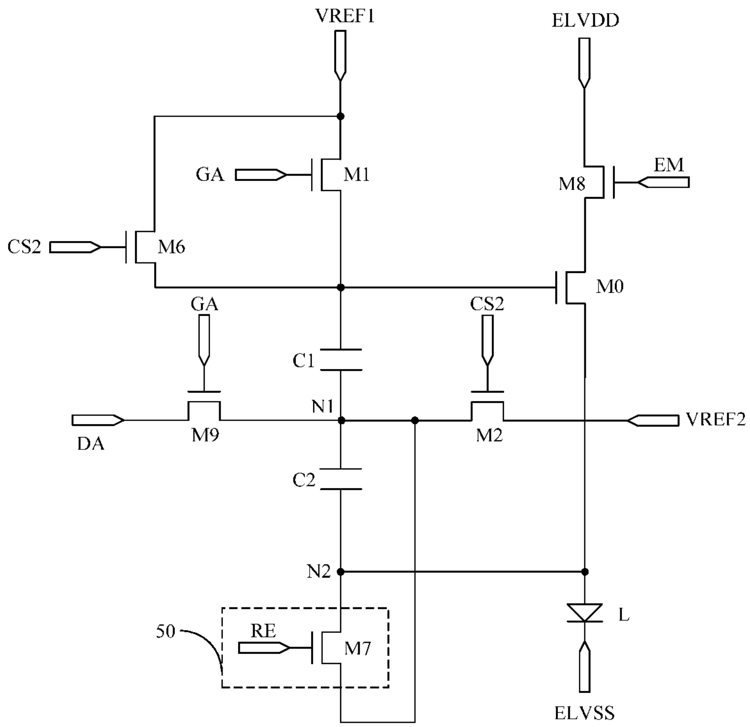
FIG. 19 shows a schematic diagram of some other specific structures of pixel circuits provided by embodiments of the present disclosure.

The embodiment of the present disclosure provides a schematic diagram of some other structures of the pixel circuits, as shown in FIG. 19, which is deformed with respect to the implementation in the above-described embodiments. Only the difference between the present embodiment and the above-described embodiments is described below, and their similarities will not be repeated herein.

In the embodiment of the present disclosure, as shown in FIG. 19, the reset circuit 50 may be configured to provide a signal of the first node N1 to the second node N2 in response to a signal of the reset signal terminal RE.

In the embodiment of the present disclosure, the first electrode of the seventh transistor M7 is coupled to the first node N1 as shown in FIG. 19.

A signal timing diagram corresponding to the pixel circuit shown in FIG. 19 may be shown in FIG. 15. When the seventh transistor M7 is conducted under the control of the high level of the reset signal, the signal of the first node N1 can be provided to the second node N2. The rest of the working process can refer to the above description and will not be repeated herein.

Figure 20:
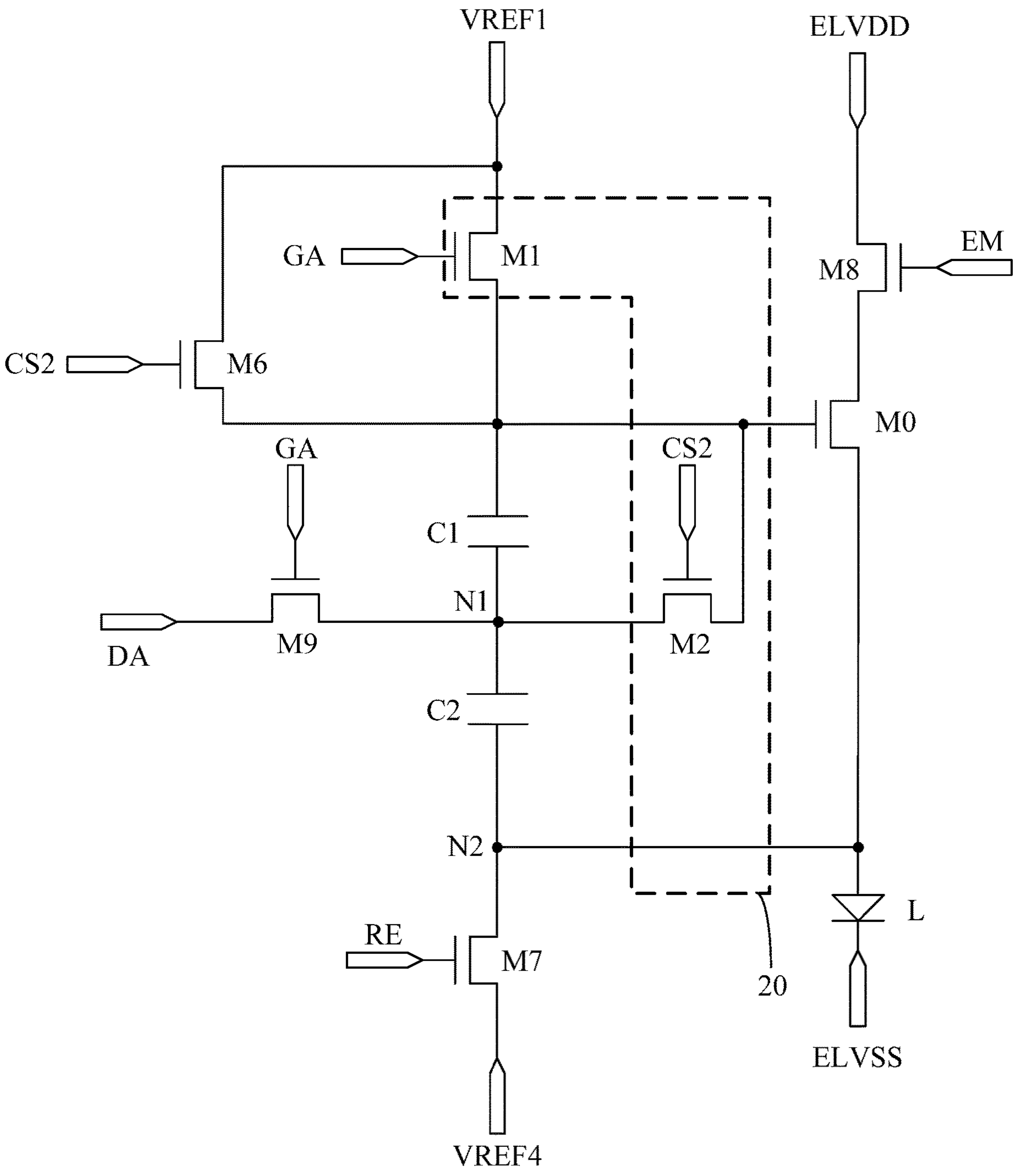
FIG. 20 shows a schematic diagram of some other specific structures of pixel circuits provided by embodiments of the present disclosure.

The embodiment of the present disclosure provides a schematic diagram of some other structures of the pixel circuits, as shown in FIG. 20, which is deformed with respect to the implementation in the above-described embodiments. Only the difference between the present embodiment and the above-described embodiments is described below, and their similarities will not be repeated herein.

In the embodiment of the present disclosure, as shown in FIG. 20, the threshold compensation circuit 20 is configured to provide a signal of the gate of the drive transistor M0 to the first node N1 in response to a signal of the second control signal terminal CS2.

In the embodiment of the present disclosure, the first electrode of the second transistor M2 is coupled to the gate of the drive transistor M0 as shown in FIG. 20.

The signal timing diagram corresponding to the pixel circuit shown in FIG. 20 may be shown in FIG. 15. When the seventh transistor M7 is conducted under the control of the high level of the reset signal, the signal of the first node N1 can be provided to the second node N2. The rest of the working process can refer to the above description, and will not be repeated herein.

Figure 21:
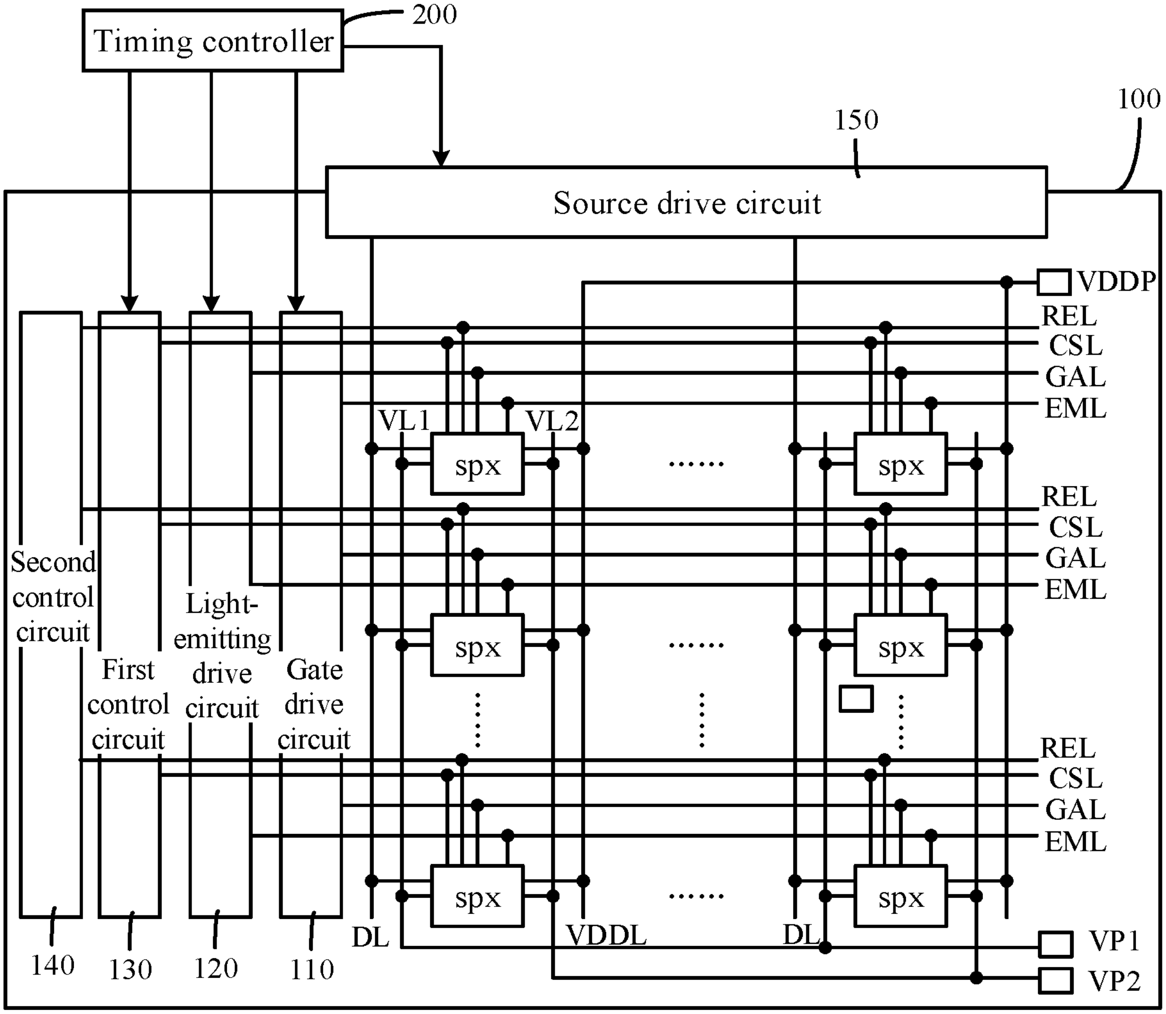
FIG. 21 shows a schematic diagram of some structures of display devices provided by embodiments of the present disclosure.

Embodiments of the present disclosure also provide a display panel, and as shown in FIG. 21, the display panel 100 includes: a plurality of pixel units arranged in an array. Exemplarily, each pixel unit includes a plurality of sub-pixels spx. Each sub-pixel spx includes any of the aforementioned pixel circuits provided by embodiments of the present disclosure. The principle of problem-solving of the display panel is similar to that of the aforementioned pixel circuits, so that the implementation of the display panel can be seen in the implementation of the aforementioned pixel circuits, and the repetition will not be described herein.

In some embodiments of the present disclosure, as shown in FIG. 21, the display panel 100 further includes: a plurality of scanning signal lines GAL; where one of the plurality of scanning signal lines GAL is coupled to scan signal terminals GA of pixel circuits in one row of sub-pixels.

In some embodiments of the present disclosure, as shown in FIG. 21, the display panel 100 further includes: a gate drive circuit 110 coupled to the plurality of scanning signal lines GAL, respectively; where the gate drive circuit 110 is configured to input scanning signals to the plurality of scanning signal lines GAL.

In some embodiments of the present disclosure, one of the plurality of scanning signal lines is also coupled to first control signal terminals CS1 of the pixel circuits in one row of sub-pixels when the first control signal terminal CS1 and the scan signal terminal GA are the same signal terminal.

In some embodiments of the present disclosure, as shown in FIG. 21, the display panel 100 further includes: a plurality of control signal lines CSL; where one of the plurality of control signal lines CSL is coupled to second control signal terminals CS2 of pixel circuits in one row of sub-pixels.

In some embodiments of the present disclosure, as shown in FIG. 21, the display panel 100 further includes: a first control drive circuit 130 coupled to the plurality of control signal lines CSL, respectively; where the first control drive circuit 130 is configured to input corresponding control signals to the plurality of control signal lines CSL.

In some embodiments of the present disclosure, one of the plurality of control signal lines is also coupled to fourth control signal terminals CS4 of pixel circuits in one row of sub-pixels when the second control signal terminal CS2 and the fourth control signal terminal CS4 are the same signal terminal.

In some embodiments of the present disclosure, as shown in FIG. 21, the display panel 100 further includes: a plurality of reset signal lines REL; where one of the plurality of reset signal lines REL is coupled to reset signal terminals RE of pixel circuits in one row of sub-pixels.

In some embodiments of the present disclosure, as shown in FIG. 21, the display panel 100 further includes: a second control drive circuit 140 coupled to the plurality of reset signal lines REL, respectively; where the second control drive circuit 140 is configured to input corresponding reset signals to the plurality of reset signal lines REL.

In some embodiments of the present disclosure, as shown in FIG. 21, the display panel 100 further includes: a plurality of light-emitting control signal lines EML; where one of the plurality of light-emitting control signal lines EML is coupled to light-emitting control signal terminals EM of pixel circuits in one row of sub-pixels.

In some embodiments of the present disclosure, as shown in FIG. 21, the display panel 100 further includes: a light-emitting drive circuit 120 coupled to the plurality of light-emitting control signal lines EML, respectively; where the light-emitting drive circuit 120 is configured to input corresponding light-emitting control signals to the plurality of light-emitting control signal lines EML.

In some embodiments of the present disclosure, as shown in FIG. 21, the display panel 100 further includes: a plurality of data lines DL, a plurality of first reference signal lines VL1, a plurality of second reference signal lines VL2, and a plurality of first power supply lines VDDL. The plurality of data lines DL, the plurality of first reference signal lines VL1, the plurality of second reference signal lines VL2, and the plurality of first power supply lines VDDL extend along a column direction of the sub-pixels, respectively. Optionally, one of the plurality of data lines DL is coupled to data signal terminals DA of pixel circuits in one column of sub-pixels. One of the plurality of first reference signal lines VL1 is coupled to first reference signal terminals VREF1 of pixel circuits in one column of sub-pixels. One of the plurality of second reference signal lines VL2 is coupled to second reference signal terminals VREF2 of pixel circuits in one column of sub-pixels. One of the plurality of first power supply lines VDDL is coupled to first power supply terminals ELVDD of pixel circuits in one column of sub-pixels.

Exemplarily, as shown in FIG. 21, the display panel 100 further includes: a first reference signal end VP1. The plurality of first reference signal lines VL1 are connected to a first reference signal bus, and the first reference signal bus is coupled to the first reference signal end VP1.

Exemplarily, as shown in FIG. 21, the display panel 100 further includes: a second reference signal end VP2. The plurality of second reference signal lines VL2 are connected to a second reference signal bus, and the second reference signal bus is coupled to the second reference signal end VP2.

Exemplarily, as shown in FIG. 21, the display panel 100 further includes: a first power supply end VDDP. The plurality of first power supply lines VDDL are connected to a first power supply bus, and the first power supply bus is coupled to the first power supply end VDDP.

In some embodiments of the present disclosure, as shown in FIG. 21, the display panel 100 further includes: a source drive circuit 150. The source drive circuit 150 is coupled to a plurality of data lines DL, respectively. Exemplarily, there may be one source drive circuit 150. Alternatively, there may be two source drive circuits, where one source drive circuit is coupled to half of the number of data lines DL, and the other source drive circuit is coupled to the other half of the number of data lines DL. Of course, there may be three, four, or more source drive circuits, which may be designed and determined in accordance with the requirements of the actual application, and the present disclosure is not limited to this.

In the embodiments of the present disclosure, a gate driver on array (GOA) technology may be used to prepare a thin film transistor (TFT) on an array substrate of a display panel, to form a gate drive circuit 110, a light-emitting drive circuit 120, a first control circuit 130 and a second control circuit 140. In this way, the gate drive circuit 110, the light-emitting drive circuit 120, the first control circuit 130 and the second control circuit 140 are all equivalent to GOA circuits. Moreover, in the embodiments of the present disclosure, by sharing the signal terminals of the pixel circuits, only four groups of GOA circuits are required to control the working of the pixel circuits. This reduces the number of GOA circuits and facilitates the realization of a narrow bezel.

Taking the signal timing diagram shown in FIG. 9 as an example, when the pixel circuit is driven with a lower refresh frequency, the light-emitting control signal em and the third control signal cs3 can be controlled by two groups of control circuits (i.e., GOA circuits) respectively. When a higher refresh frequency is adopted (e.g., taking the frequency of the scanning signal ga for the input of the data voltage as the display frequency, this higher refresh frequency is a frequency higher than the display frequency), the scanning signal ga, the first control signal cs1, the second control signal cs2 and the fourth control signal cs4 can be refreshed by using the first refresh frequency, to save power consumption. The light-emitting control signal em, the third control signal cs3 and the reset signal re are driven by using a second frequency, and screen flicker is alleviated at a lower frequency. Moreover, the working process of the pixel circuit in combination with the rest of the signal timing diagrams can also be obtained in a similar manner, and will not be repeated herein.

It is to be noted that with respect to the sharing of the signal lines, the sharing of the signal terminals, and the like as described above, they may be arranged in combination with each other for different structures of the pixel circuits. For example, some of the pixel circuits are provided with the third transistors M3, and some of the pixel circuits are not provided with the third transistor M3. Moreover, the second reference signal terminal VREF2 may be at least one of the first power supply terminal ELVDD, the second power supply terminal ELVSS, or the initialization signal terminal VINIT; and they may also be arranged in combination with each other as long as they do not affect the working of the pixel circuit.

Embodiments of the present disclosure also provide a display device, and as shown in FIG. 21, the display device may include: a display panel 100 and a timing controller 200. Exemplarily, the timing controller 200 may receive display data of an image to be displayed in a display frame and input corresponding control signals to the gate drive circuit 110, the light-emitting drive circuit 120, the first control circuit 130 and the second control circuit 140, respectively, to cause the gate drive circuit 110 to output a corresponding scanning signal to the scanning signal line GAL, cause the light-emitting drive circuit 120 to output a corresponding light-emitting control signal to the light-emitting control signal line EML, cause the first control circuit 130 to output a corresponding control signal to the control signal line CSL, and cause the second control circuit 140 to output a corresponding reset signal to the control signal line REL. The timing controller 200 may also perform corresponding processing on the received display data and send the display data after being processed to the source drive circuit 150. The source drive circuit 150 may input corresponding data voltages to the data lines DL according to the received display data, respectively, so that corresponding data voltages are input to the pixel circuits to realize a screen display function of this display frame.

In specific implementation, in the embodiments of the present disclosure, the display device may be: a cellular phone, a tablet computer, a television, a monitor, a laptop computer, a digital photo frame, a navigator, and any other product or component having a display function. Other essential components of the display device should be understood by those of ordinary skill in the art, and are not described herein, nor should they be taken as limitations on the present disclosure.

Although preferred embodiments of the present disclosure have been described, additional changes and modifications may be made to these embodiments once the basic inventive concepts are known to those skilled in the art. Therefore, the appended claims are intended to be construed to include the preferred embodiments as well as all changes and modifications that fall within the scope of the present disclosure.

Obviously, those skilled in the art can make various modifications and variations to the embodiments of the present disclosure without departing from the spirit and scope of the embodiments of the present disclosure. Thus, if these modifications and variations of the embodiments of the present disclosure fall within the scope of claims of the present disclosure and their technical equivalents, the present disclosure is intended to include these modifications and variations.

What is claimed is:

1. A pixel circuit, comprising:

a light-emitting device;

a drive transistor configured to generate a driving current for driving the light-emitting device to emit light based on a data voltage;

a data writing circuit configured to provide a data voltage of a data signal terminal to a first node in response to a signal of a scan signal terminal;

a threshold compensation circuit configured to write a threshold voltage of the drive transistor to a second node;

a first coupling control circuit connected between the first node and a gate of the drive transistor, and configured to stabilize a voltage of the first node and a voltage of the gate of the drive transistor; and a second coupling control circuit connected between the first node and the second node, and configured to stabilize the voltage of the first node and a voltage of the second node and couple an amount of voltage variation of the first node to the second node;

wherein the threshold compensation circuit is further configured to:

provide a signal of a first reference signal terminal to the gate of the drive transistor in response to a signal of a first control signal terminal; and provide a signal of a second reference signal terminal or a signal of the gate of the drive transistor to the first node in response to a signal of a second control signal terminal;

wherein the pixel circuit further comprises: an auxiliary control circuit;

wherein the auxiliary control circuit is configured to provide a signal of a third reference signal terminal to the gate of the drive transistor in response to a signal of a fourth control signal terminal wherein the first control signal terminal and the scan signal terminal are a same signal terminal;

and/or, the second control signal terminal and the fourth control signal terminal are a same signal terminal;

and/or, the third reference signal terminal and the first reference signal terminal are a same signal terminal.

2. The pixel circuit according to claim 1, wherein the first coupling control circuit comprises: a first capacitor; and a first electrode plate of the first capacitor is coupled to the gate of the drive transistor, and a second electrode plate of the first capacitor is coupled to the first node and/or the second coupling control circuit comprises: a second capacitor; and a first electrode plate of the second capacitor is coupled to the first node, and a second electrode plate of the second capacitor is coupled to the second node.

3. The pixel circuit according to claim 1, wherein a maintenance duration of an active level of the first control signal terminal is greater than a maintenance duration of an active level of the second control signal terminal;

wherein the active level of the first control signal terminal comprises an overlapping duration with the active level of the second control signal terminal.

4. The pixel circuit according to claim 1, wherein an end time of the active level of the first control signal terminal is the same as an end time of the active level of the scan signal terminal;

or, a start time of the active level of the scan signal terminal occurs after a third interval duration following an end time of the active level of the first control signal terminal.

5. The pixel circuit according to claim 1, wherein the threshold compensation circuit is further configured to conduct a second electrode of the drive transistor and the second node in response to a signal of a third control signal terminal.

6. The pixel circuit according to claim 5, wherein the third control signal terminal comprises an active level in response to the second control signal terminal comprising an active level signal; and the third control signal terminal comprises an inactive level signal in response to the scan signal terminal comprising an active level signal;

or the threshold compensation circuit comprises: a first transistor, a second transistor, and a third transistor;

a gate of the first transistor is coupled to the first control signal terminal, a first electrode of the first transistor is coupled to the first reference signal terminal, and a second electrode of the first transistor is coupled to the gate of the drive transistor;

a gate of the second transistor is coupled to the second control signal terminal, a first electrode of the second transistor is coupled to the second reference signal terminal or the gate of the drive transistor, and a second electrode of the second transistor is coupled to the first node; and a gate of the third transistor is coupled to the third control signal terminal, a first electrode of the third transistor is coupled to the second electrode of the drive transistor, and a second electrode of the third transistor is coupled to the second node.

7. The pixel circuit according to claim 1, wherein the second electrode of the drive transistor is directly coupled to the second node.

8. The pixel circuit according to claim 7, wherein the threshold compensation circuit comprises: a first transistor and a second transistor;

a gate of the first transistor is coupled to the first control signal terminal, a first electrode of the first transistor is coupled to the first reference signal terminal, and a second electrode of the first transistor is coupled to the gate of the drive transistor; and a gate of the second transistor is coupled to the second control signal terminal, a first electrode of the second transistor is coupled to the second reference signal terminal or the gate of the drive transistor, and a second electrode of the second transistor is coupled to the first node.

9. The pixel circuit according to claim 1, wherein the auxiliary control circuit comprises: a sixth transistor; and a gate of the sixth transistor is coupled to the fourth control signal terminal, a first electrode of the sixth transistor is coupled to the third reference signal terminal, and a second electrode of the sixth transistor is coupled to the gate of the drive transistor.

10. The pixel circuit according to claim 1, further comprising: a reset circuit; and the reset circuit is configured to provide a signal of the fourth reference signal terminal or a signal of the first node to the second node in response to a signal of a reset signal terminal.

11. The pixel circuit according to claim 10, wherein the reset circuit comprises: a seventh transistor; and a gate of the seventh transistor is coupled to the reset signal terminal, a first electrode of the seventh transistor is coupled to the fourth reference signal terminal or the first node, and a second electrode of the seventh transistor is coupled to the second node.

12. The pixel circuit according to claim 1, wherein the pixel circuit further comprises: a light-emitting control circuit; and the light-emitting control circuit is configured to provide a signal of a first power supply terminal to the first electrode of the drive transistor in response to a signal of the light-emitting control signal terminal.

13. The pixel circuit according to claim 1, wherein the data writing circuit comprises: a ninth transistor; and a gate of the ninth transistor is coupled to the scan signal terminal, a first electrode of the ninth transistor is coupled to the data signal terminal, and a second electrode of the ninth transistor is coupled to the first node.

14. A display device, comprising:

a display panel, comprising a plurality of sub-pixels; wherein at least one of the plurality of sub-pixels comprises the pixel circuit according to claim 1.

15. The display device according to claim 14, wherein the display panel further comprises:

a plurality of scanning signal lines; wherein one of the plurality of scanning signal lines is coupled to scan signal terminals of pixel circuits in one row of sub-pixels;

a gate drive circuit coupled to the plurality of scanning signal lines respectively; wherein the gate drive circuit is configured to input scanning signals to the plurality of scanning signal lines;

a plurality of control signal lines; wherein one of the plurality of control signal lines is coupled to second control signal terminals of pixel circuits in one row of sub-pixels;

a first control drive circuit coupled to the plurality of control signal lines respectively;

wherein the first control drive circuit is configured to input corresponding control signals to the plurality of control signal lines;

a plurality of reset signal lines; wherein one of the plurality of reset signal lines is coupled to reset signal terminals of pixel circuits in one row of sub-pixels;

a second control drive circuit, coupled to the plurality of reset signal lines respectively; wherein the second control drive circuit is configured to input corresponding reset signals to the plurality of reset signal lines;

a plurality of light-emitting control signal lines; wherein one of the plurality of light-emitting control signal lines is coupled to light-emitting control signal terminals of pixel circuits in one row of sub-pixels; and a light-emitting drive circuit, coupled to the plurality of light-emitting control signal lines respectively; wherein the light-emitting drive circuit is configured to input corresponding light-emitting control signals to the plurality of light-emitting control signal lines.

16. A method for driving the pixel circuit according to claim 1, comprising:

in a threshold compensation period, writing, by a threshold compensation circuit, a threshold voltage of the drive transistor to a second node; stabilizing, by a first coupling control circuit, a voltage of the first node and a voltage of a gate of the drive transistor; and stabilizing, by a second coupling control circuit, the voltage of the first node and a voltage of the second node;

in a data writing period, providing, by a data writing circuit, a data voltage of a data signal terminal to the first node in response to a signal of a scan signal terminal; stabilizing, by the first coupling control circuit, the voltage of the first node and the voltage of the gate of the drive transistor; and coupling, by the second coupling control circuit, an amount of voltage variation of the first node to the second node; and in a light-emitting period, stabilizing, by the second coupling control circuit, the voltage of the first node and the voltage of the second node; stabilizing, by the first coupling control circuit, the voltage of the first node and the voltage of the gate of the drive transistor; and generating, by the drive transistor, a driving current for driving the light-emitting device to emit light based on the data voltage, and driving the light-emitting device to emit light.

17. The method for driving the pixel circuit according to claim 16, wherein before the threshold compensation period, the method further comprises:

in an initialization period, providing, by the threshold compensation circuit, a signal of a first reference signal terminal to a gate of the drive transistor in response to a signal of a first control signal terminal; and providing, by the threshold compensation circuit, a signal of a second reference signal terminal to the first node in response to a signal of a second control signal terminal.

* * * * *